(12) United States Patent
Inoue et al.

(10) Patent No.: US 7,680,296 B2
(45) Date of Patent: Mar. 16, 2010

(54) INFORMATION EMBEDDING DEVICE AND PROGRAM FOR CHANGING A NUMBER OF POINTS THAT EXIST ON SIDES OF A POLYGON

(75) Inventors: Hisashi Inoue, Fukuoka (JP); Masataka Ejima, Osaka (JP); Kenichi Noridomi, Fukuoka (JP); Takashi Katsura, Fukuoka (JP); Shugo Horikami, Ichikawa (JP)

(73) Assignee: Panasonic Corporation, Osaka (JP)

( * ) Notice: Subject to any disclaimer, the term of this patent is extended or adjusted under 35 U.S.C. 154(b) by 602 days.

(21) Appl. No.: 10/558,923

(22) PCT Filed: Aug. 18, 2004

(86) PCT No.: PCT/JP2004/012159

§ 371 (c)(1),
(2), (4) Date: Dec. 15, 2006

(87) PCT Pub. No.: WO2005/020563

PCT Pub. Date: Mar. 3, 2005

(65) Prior Publication Data
US 2007/0127769 A1    Jun. 7, 2007

(30) Foreign Application Priority Data

Aug. 22, 2003 (JP) ............................. 2003-299031
Sep. 19, 2003 (JP) ............................. 2003-328204
Sep. 30, 2003 (JP) ............................. 2003-339715

(51) Int. Cl.
*G06K 9/00* (2006.01)

(52) U.S. Cl. ................................................. 382/100

(58) Field of Classification Search ................. 382/100; 345/433, 439, 117, 118, 135, 340, 342, 419, 345/619, 733, 734, 744; 380/252
See application file for complete search history.

(56) References Cited

U.S. PATENT DOCUMENTS

2002/0122564 A1*  9/2002  Rhoads et al. .............. 382/100

FOREIGN PATENT DOCUMENTS

| JP | 2001-078019 | * | 3/2001 |
|----|-------------|---|--------|
| JP | 2001-209780 |   | 8/2001 |
| JP | 2001-339597 |   | 12/2001 |
| JP | 2002-152486 |   | 5/2002 |
| JP | 2002-209086 | * | 7/2002 |
| JP | 2002-300374 |   | 10/2002 |
| JP | 2003-067776 |   | 3/2003 |
| JP | 2003-101751 |   | 4/2003 |

OTHER PUBLICATIONS

Machine translation for JPN 2002-209086.*
Machine translation for JPN 2001-078019.*

* cited by examiner

*Primary Examiner*—Samir A. Ahmed
*Assistant Examiner*—Atiba O Fitzpatrick
(74) *Attorney, Agent, or Firm*—Wenderoth, Lind & Ponack, L.L.P.

(57) ABSTRACT

Information embedding is performed by extracting vertices constituting a polygon from vector data, and changing a number of points that exist on sides of the polygon based on embedment information. Further, information reading is performed by extracting points existing on the sides of the polygon from the embedment information and embedded vector data, and by reading the embedment information according to a predetermined rule.

22 Claims, 22 Drawing Sheets

Fig. 3(a)
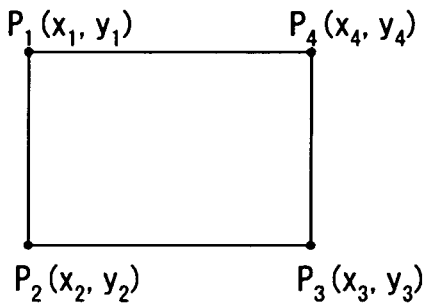
Fig. 3(b)
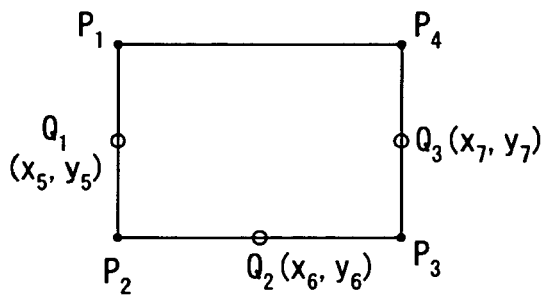
Fig. 3(c)
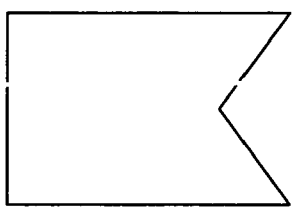
Fig. 3(d)
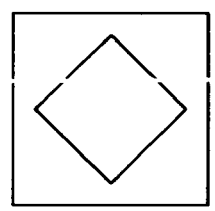
Fig. 4(a)
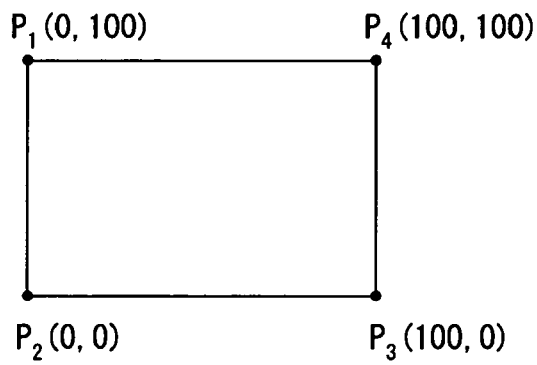
Fig. 4(b)
| M | Z | Q | W | remainder |
|---|---|---|---|---|
| 0 | 4 | 0 | 4 | 0 |
| 1 | 4 | 1 | 5 | 1 |
| 2 | 4 | 2 | 6 | 2 |
| 3 | 4 | 3 | 7 | 3 |

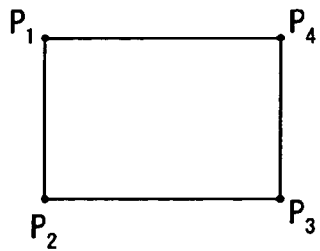
Fig. 5(a)
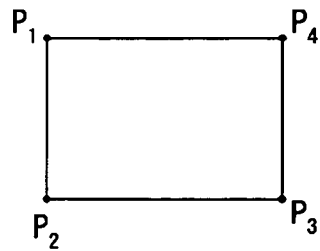
Fig. 5(b)
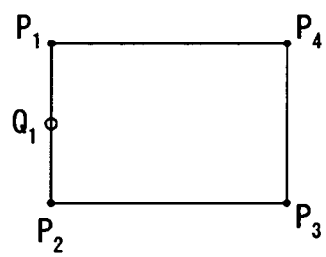
Fig. 5(c)
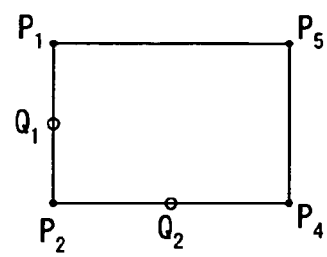
Fig. 5(d)
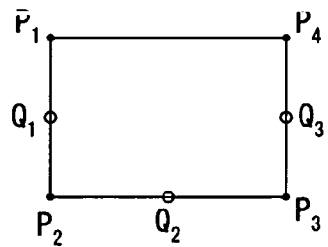
Fig. 5(e)
Fig. 6(a)
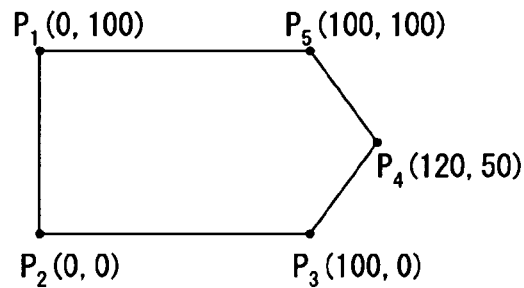
Fig. 6(b)
| M | Z | Q | W | remainder |
|---|---|---|---|---|
| 0 | 5 | 3 | 8 | 0 |
| 1 | 5 | 1 | 6 | 2 |
| 2 | 5 | 0 | 5 | 1 |
| 3 | 5 | 2 | 7 | 3 |

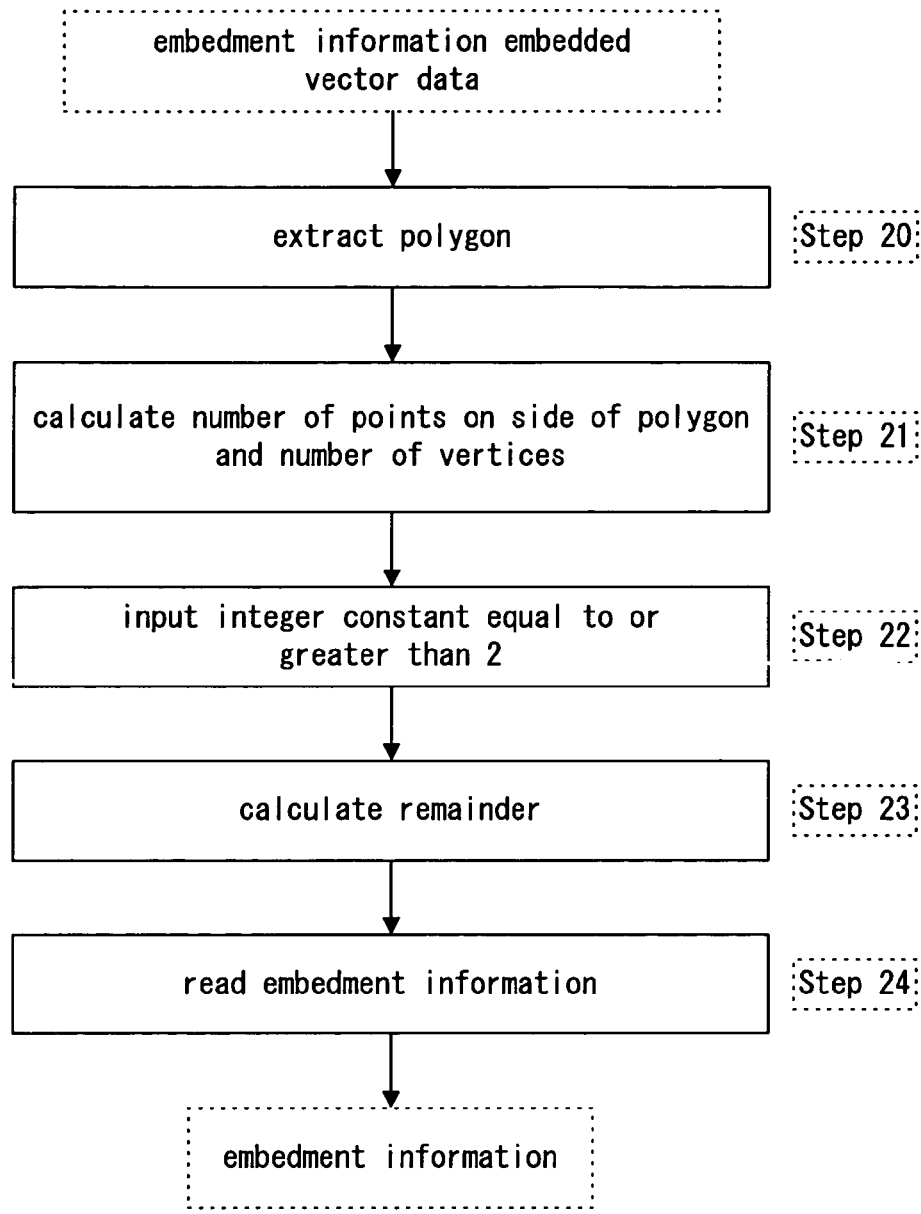

Fig. 21(a)    Fig. 21(b)    Fig. 21(c)
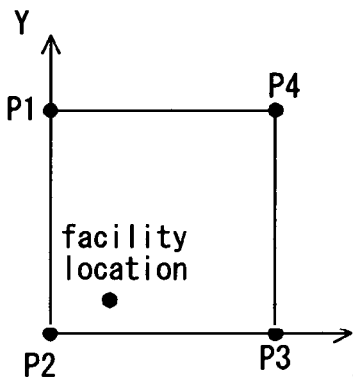
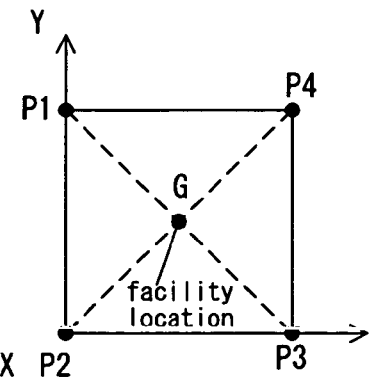
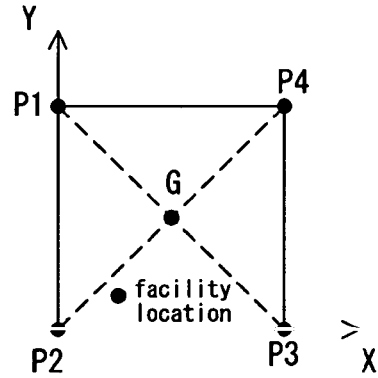
Fig. 22
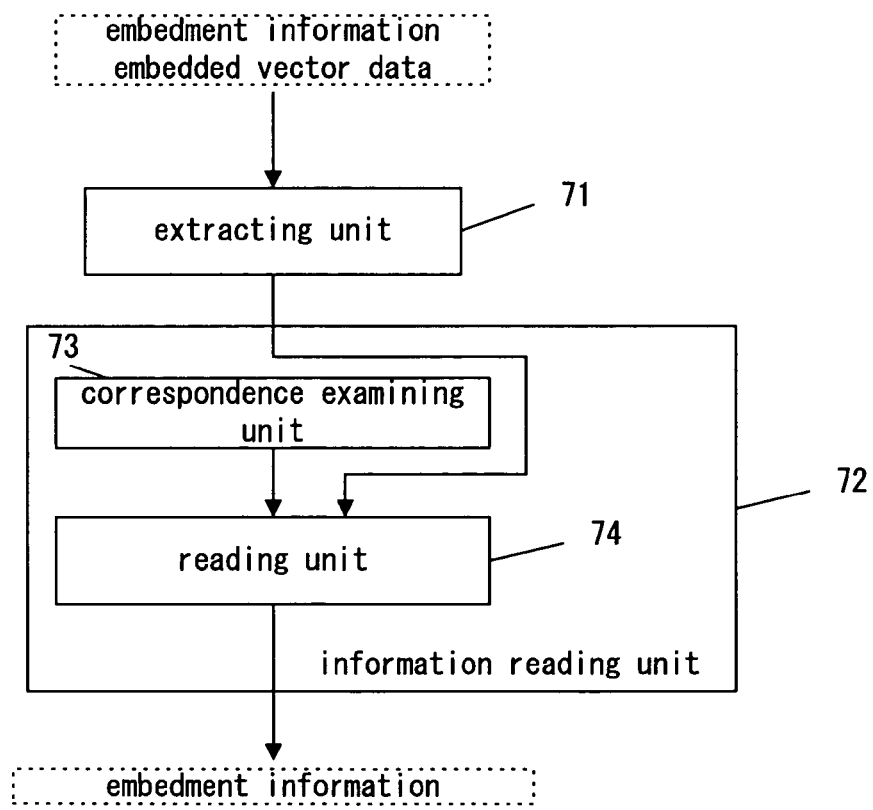

INFORMATION EMBEDDING DEVICE AND PROGRAM FOR CHANGING A NUMBER OF POINTS THAT EXIST ON SIDES OF A POLYGON

FIELD OF THE INVENTION

The present invention relates to an information embedding device which embeds embedment information in vector data and an art related thereto.

DESCRIPTION OF THE RELATED ART

Demand of an electronic map is increasing with the spread of a car navigation system and the Internet. To a digital content such as the electronic map, a copy can be created easily. Accordingly, an illegal copy is increasing and protection of copyrights poses an important problem.

Document 1 (published Japanese Patent Application Laid-Open No. 2001-78019) discloses the following information embedding method.

The information embedding method disclosed in the document 1 is explained using FIG. 34. In each drawing of FIG. 34, a horizontal axis and a vertical axis are an x-coordinate axis and a y-coordinate axis, respectively.

First, a reference point S is calculated from an embedding target point A. More specifically, the reference point S is calculated by masking lower digits of the coordinate of the embedding target point A according to embedment information.

A slashed area of FIG. 34(a) shows a range in which the reference point S can take with respect to the embedding target point A.

Moreover, the slashed area of FIG. 34(a) is divided into two areas of an area a of FIG. 34(b), and an area β of FIG. 34(c). The area α is used in a case of embedment information "1", and the area β is used in a case of embedment information "0".

That is, in the case of the embedment information "1", the embedding target point A is moved to a point B of FIG. 34(b), and in the case of the embedment information "0", the embedding target point A is moved to a point B of FIG. 34(c).

In reading the embedment information ("1" or "0"), the reference point S is calculated, and the area α (FIG. 34(b)) and the area β (FIG. 34(c)) are calculated, in the same manner as mentioned above. Thereafter, the embedment information is determined by which area the point B belongs to, the area α or the area β.

Moreover, document 2 (published Japanese Patent Application Laid-Open No. 2002-300374) discloses the following art.

First, as shown in FIG. 35(a), two reference points A and B are extracted. These reference points A and B are both endpoints of a figure.

Next, based on the x-coordinates of the reference points A and B, a distance between the reference points A and B is divided into n equal parts (here n=5), and 1-bit information is embedded in each section.

Here, when information "0" is embedded, the number of points within the section is made to be even. When information "1" is embedded, the number of points within the section is made to be odd.

In reading the embedment information, in the same manner as mentioned above, each section is determined whether a value of the embedment information is "1" or "0" is determined by whether the number of the points within these sections is either even or odd.

The documents 1 and 2 do not expect a case where the x-y coordinate system changes between the time of embedding information and the time of reading information, and do not meet the case where the x-y coordinate system changes. Therefore, when a rotation operation of a figure is performed between the time of embedding the information and the time of reading the information, it becomes impossible to read correctly the embedment information only from vector data after the operation.

This point becomes remarkable when a rotation operation occurs frequently, like in a case of the map data, and, as a matter of fact, the methods of the documents 1 and 2 cannot be applied to vector data with such a property.

BRIEF SUMMARY OF THE INVENTION

An object of the present invention is to provide an information embedding device which can cope with a rotation operation of vector data.

A first aspect of the present invention provides an information embedding device, comprising: an extracting unit operable to extract information of vertices composing a polygon from vector data including information of the polygon; and an information embedding unit operable, utilizing the information of vertices extracted by the extracting unit, to embed embedment information into the vector data in a robust manner against rotating operation.

According to the present structure, even when the vector data has undergone the rotation operation, the embedment information is held, and trouble is not produced when the embedment information is read out later.

A second aspect of the present invention provides the information embedding device as claimed in the first aspect, wherein the information embedding unit operates, according to the embedment information, a total number of points of the polygon that the embedment information has been embedded.

According to the present structure, the total number of the points of the polygon does not change when the polygon rotates. Even when a malicious third person moves the point of the polygon in order to nullify the embedment information, no trouble may occur in reading the embedment information later.

A third aspect of the present invention provides the information embedding device as claimed in the first aspect, wherein the information embedding unit operates, according to the embedment information, a distance between specified points of the polygon that the embedment information has been embedded.

According to the present structure, the distance between specific points of the polygon does not change, even when the polygon rotates. Therefore, no trouble may occur in reading the embedment information later.

A fourth aspect of the present invention provides the information embedding device as claimed in the first aspect, wherein the information embedding unit changes, according to the embedment information, a number of points that exist on sides of the polygon.

According to the present structure, the total number of the points of the polygon changes.

A fifth aspect of the present invention provides the information embedding device as claimed in the first aspect, wherein the information embedding unit inserts a point on a side of the polygon.

According to the present structure, a shape of the polygon does not change after the point is inserted.

A sixth aspect of the present invention provides the information embedding device as claimed in the first aspect, wherein the information embedding unit inserts a point at a position apart from a side of the polygon.

According to the present structure, a shape of the polygon can be made distorted by inserting the point.

A seventh aspect of the present invention provides the information embedding device as claimed in the first aspect, wherein the information embedding unit changes a number of points that exist on sides of the polygon in a manner such that a remainder value and a value M of the embedment information have a fixed correspondence, the remainder value being a remainder value where a number of points existing on sides of the polygon is divided by a constant number N, wherein the constant number N is an integer not less than a value of 2 and the value M is a non-negative integer less than the constant number N.

An eighth aspect of the present invention provides the information embedding device as claimed in the seventh aspect, wherein the fixed correspondence is a relationship that the remainder value equals to the value M of the embedment information.

A ninth aspect of the present invention provides the information embedding device as claimed in the fourth aspect, wherein the information embedding unit comprises: a constant information inputting unit operable to input a constant number N (N is an integer not less than a value of 2); a remainder calculating unit operable to calculate a remainder where a number of vertices extracted by the extracting unit is divided by the constant number N; an inserting number determining unit operable to determine a number of points to be inserted on a side of the polygon in a manner such that the remainder calculated by the remainder calculating unit and the embedment information have a fixed correspondence; and an insertion executing unit operable to insert points as many as the number determined by the inserting number determining unit into the polygon.

According to these structures, the embedment information can be easily specified by the correspondence between the value of the remainder and the value of the embedment information.

A tenth aspect of the present invention provides the information embedding device as claimed in the first aspect, wherein the constant number N is a constant number that does not depend on a number of vertices of the polygon.

According to the present structure, whatever the number of sides of the polygon is, the embedment information can be embedded by a constant rule.

An eleventh aspect of the present invention provides an information reading device, comprising: an extracting unit operable to extract points on a polygon from embedment information-embedded vector data; and an information reading unit operable to read the embedment information according to a number of the points extracted by the extracting unit and a predetermined rule.

A twelfth aspect of the present invention provides the information reading device as claimed in the eleventh aspect, wherein the predetermined rule is a rule that a remainder value and a value of the embedment information have a fixed relationship, the remainder value being a remainder value where a number of points extracted by the extracting unit is divided by a constant number N (N is an integer not less than a value of 2).

A thirteenth aspect of the present invention provides the information reading device as claimed in the twelfth aspect, wherein the fixed relationship is a relationship that the remainder value equals to the value of the embedment information.

According to these structures, the embedment information which is not lost by a rotation operation can be read certainly.

A fourteenth aspect of the present invention provides the information reading device as claimed in the eleventh aspect, wherein the information reading unit comprises: a number calculating unit operable to calculate a number of the points extracted by the extracting unit; a constant information inputting unit operable to input a constant number N (N is an integer not less than a value of 2); a remainder calculating unit operable to calculate a remainder where the number calculated by the number calculating unit is divided by the constant number N; and an information reading unit operable to read the embedment information according to the remainder calculated by the remainder calculating unit.

According to the present structure, the embedment information can be specified based on the remainder.

A fifteenth aspect of the present invention provides the information embedding device as claimed in the first aspect, wherein the information embedding unit changes a representative point that has been determined concerning the polygon in a manner such that a correspondence among a plurality of geometrical elements of the polygon changes.

A sixteenth aspect of the present invention provides the information embedding device as claimed in the fifteenth aspect, wherein the representative point includes a vertex of the polygon.

A seventeenth aspect of the present invention provides the information embedding device as claimed in the fifteenth aspect, wherein the plurality of geometrical elements are selected from a group consisting of a diagonal of the polygon, a center of gravity of the polygon, a vertex of the polygon, and a representative point of the polygon.

According to these structures, the embedment information can be embedded in the polygon reflecting the geometric property of the polygon.

An eighteenth aspect of the present invention provides the information embedding device as claimed in the seventeenth aspect, wherein the diagonal of the polygon is the longest diagonal.

A nineteenth aspect of the present invention provides the information embedding device as claimed in the eighteenth aspect, wherein the information embedding unit changes the representative point in a manner such that the longest diagonal keeps longest nature.

According to the present structure, it is easy to specify a diagonal which is to be targeted.

A twentieth aspect of the present invention provides the information embedding device as claimed the fifteenth aspect, wherein the correspondence is expressed using a distance between the plurality of geometrical elements.

According to the present structure, the correspondence can be expressed in terms of the distance.

A twenty-first aspect of the present invention provides the information embedding device as claimed in the fifteenth aspect, wherein the information embedding unit comprises: a correspondence determining unit operable to determine a correspondence between a value of the embedment information and the plurality of geometrical elements; and an embedding unit operable to change the representative point according to the correspondence determined by the correspondence determining unit.

A twenty-second aspect of the present invention provides the information embedding device as claimed in the fifteenth aspect, wherein the representative point is a center of gravity of the polygon.

According to the present structure, the embedment information can be embedded in the polygon reflecting the geometric property of the polygon.

A twenty-third aspect of the present invention provides the information embedding device as claimed in the fifteenth aspect, wherein the representative point indicates a facility location.

According to the present structure, the embedment information can be embedded in a polygon without changing a shape of the polygon.

BRIEF DESCRIPTION OF DRAWINGS

FIG. 3(a) to FIG. 3(d) are illustrations of a polygon according to Embodiment 1 of the present invention;

FIG. 4(a) is an illustration of the polygon according to Embodiment 1 of the present invention;

FIG. 4(b) is a diagram illustrating a relationship of embedment information according to Embodiment 1 of the present invention;

FIG. 5(a) to FIG. 5(e) are explanatory drawings of examples of embedding embedment information in Embodiment 1 of the present invention;

FIG. 6(a) is an illustration of the polygon according to Embodiment 1 of the present invention;

FIG. 6(b) is a diagram illustrating a relationship of embedment information according to Embodiment 1 of the present invention;

FIG. 9 is a flowchart of the information reading device according to Embodiment 2 of the present invention;

FIG. 10(a) and FIG. 10(b) are diagrams illustrating a relationship of embedment information according to Embodiment 2 of the present invention;

FIG. 21(a) to FIG. 21(c) are illustrations of polygons according to Embodiment 5 of the present invention;

FIG. 22 is a functional block diagram of an information reading device according to Embodiment 6 of the present invention;

DETAILED DESCRIPTION OF THE INVENTION

Hereinafter, embodiments of the present invention are described with reference to the accompanying drawings.

Embodiment 1

Figure 1:
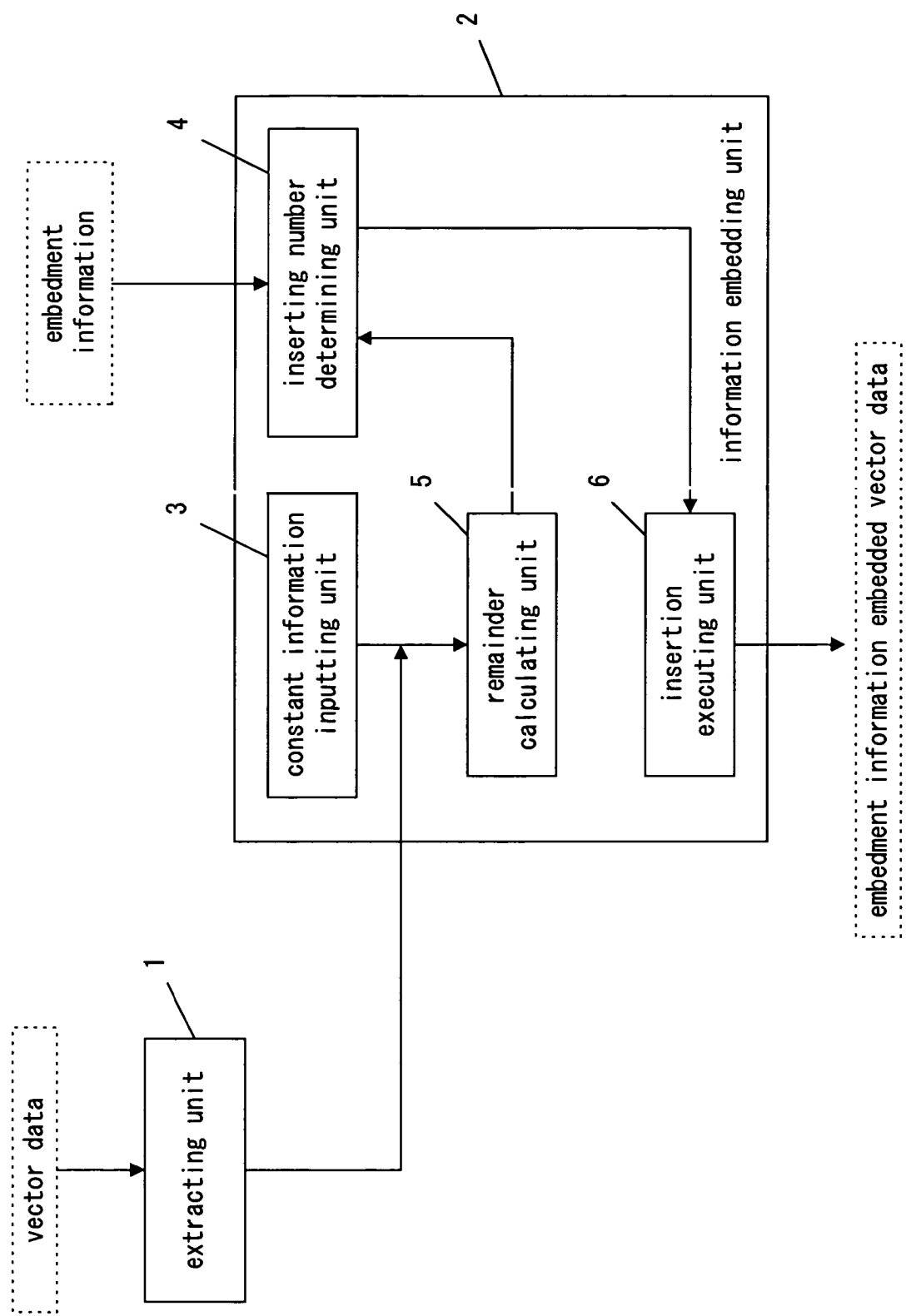
FIG. 1 is a functional block diagram of an information embedding device according to Embodiment 1 of the present invention.

Hereinafter, Embodiment 1 of the present invention is explained with reference to the accompanying drawings. FIG. 1 is a functional block diagram of an information embedding device according to Embodiment 1 of the present invention.

As shown in FIG. 1, the information embedding device comprises an extracting unit 1 and an information embedding unit 2. The information embedding unit 2 comprises a constant information inputting unit 3, an inserting number determining unit 4, a remainder calculating unit 5, and an insertion executing unit 6. The information embedding unit 2, using information of vertices extracted by the extracting unit 1, embeds embedment information in vector data in a manner such that the embedment information is held even when the coordinate system of the vector data is edited.

The extracting unit 1 inputs the vector data which includes information of a polygon, and extracts, from the vector data, the information of plural vertices which constitutes the polygon.

The constant information inputting unit 3 inputs a constant N (an integer equal to or greater than 2).

The remainder calculating unit 5 calculates a value of a remainder of the number of the extracted vertices when divided by the constant N determined by the constant information inputting unit 3. The inserting number determining unit 4 determines the number of insertion points to be inserted into the polygon such that the value of the remainder calculated by the remainder calculating unit 5 and a value of the embedment information may have a fixed correspondence (both values are equal in the present embodiment).

The insertion executing unit 6 inserts, on a side of the extracted polygon, as many insertion points as the number determined by the inserting number determining unit 4, thereby embedding the embedment information.

Figure 2:
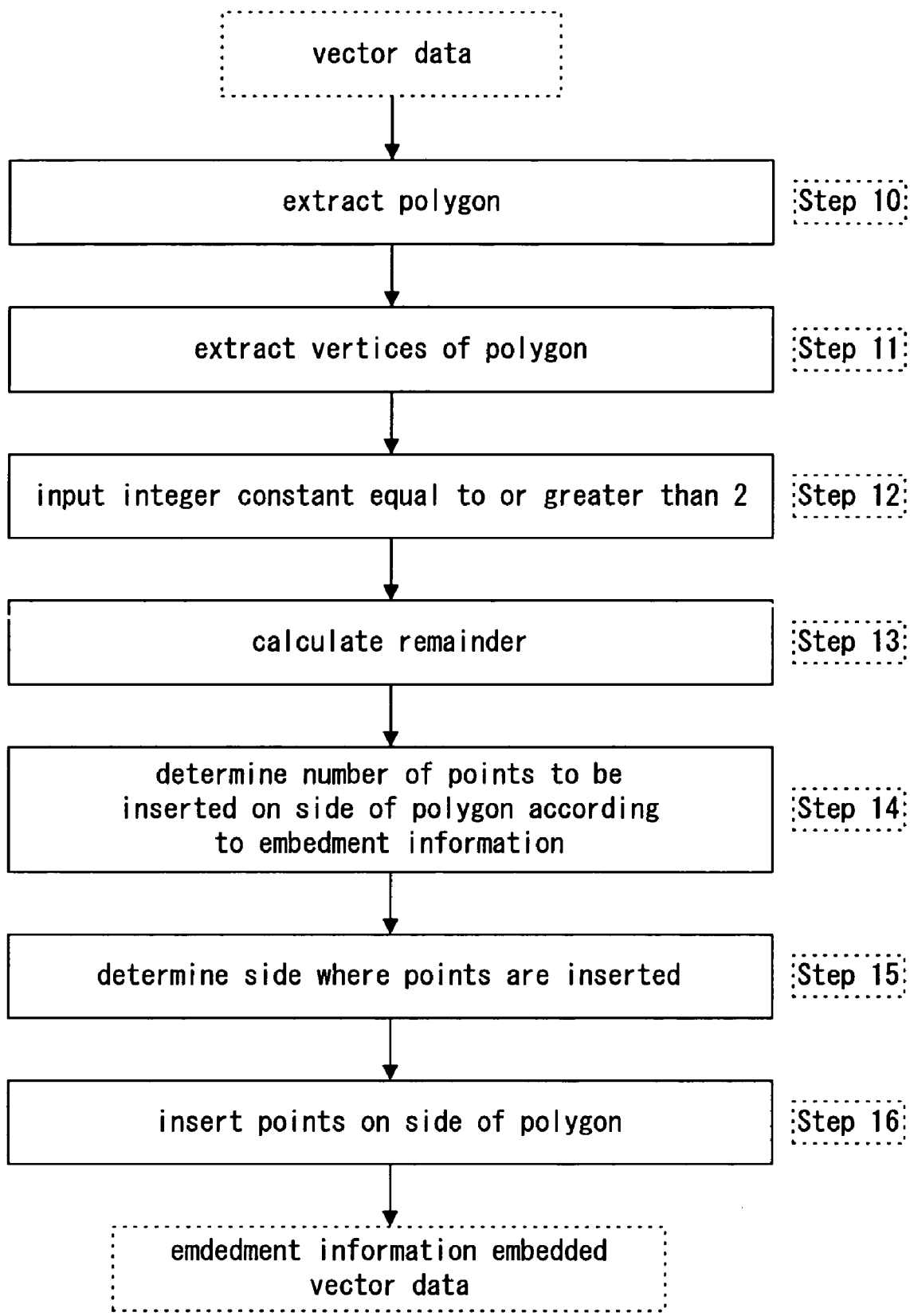
FIG. 2 is a flowchart of the information embedding device according to Embodiment 1 of the present invention.

FIG. 2 is a flowchart of the information embedding device according to Embodiment 1 of the present invention.

As shown in FIG. 2, the extracting unit 11 extracts a polygon from the inputted vector data at Step 10, and also extracts vertices of the extracted polygon at Step 11.

At Step 12, the constant information inputting unit 3 inputs a constant N.

At Step 13, the remainder calculating unit 5 calculates a value of the remainder of the number of the extracted vertices when divided by the constant N. At Step 14, the inserting number determining unit 4 sets the value of the remainder to a value of embedment information.

The insertion executing unit 6 determines a side on which the insertion points are inserted at Step 15, and inserts as many points as what to be inserted on the side of the extracted polygon at Step 16, thereby embedding the embedment information.

In addition, the constant N inputted at Step 12 is used as key information in reading the embedment information.

In the present embodiment, the extracted polygon is a quadrangle and embedment information is embedded by inserting a point on a side of the quadrangle.

FIG. 3(a) shows an example of the extracted polygon (a quadrangle with vertices P1 (x1, y1), P2 (x2, y2), P3 (x3, y3), and P4 (x4, y4)). In the example of FIG. 3(a), the number of the vertices of the extracted polygon is "4."

Now, it is assumed that the constant N=N0 and the embedment information M=M0. Here, the number of points to be inserted is determined such that the value of the remainder of the sum of the number of points to be inserted and the number of the vertices of the extracted polygon "4", divided by N0 is equal to M0. That is, the embedment information M0 is embedded by inserting M0 pieces of points.

In the present embodiment, the fixed correspondence that the value of the remainder and the embedment information M0 are equal is used. However, the fixed correspondence is not limited to this example, but the fixed correspondence may be changed arbitrarily as long as one can be uniquely determined by the other. For example, if N0=4 and M0=2, two points may be inserted.

In the present embodiment, points are inserted as follows.

That is, the points are inserted on three sides of P1P2, P2P3, and P3P4, respectively among four sides of the polygon P1P2 P3P4 shown in FIG. 3(a).

At this time, as shown in FIG. 3(b), it is assumed that the insertion points are at the middle points Q1 (x5, y5), Q2 (x6, y6), and Q3 (x7, y7) of the three sides P1P2, P2P3, and P3P4, respectively. The insertion points are not necessarily at the middle points.

The extracted polygon may be a concave polygon as shown in FIG. 3(c) and a polygon which "has a loop inside" as shown in FIG. 3(d).

FIG. 4(a) shows an example of an extracted polygon (a quadrangle with vertices of P1 (0,100), P2 (0, 0), P3 (100, 0), and P4 (100,100)).

FIG. 4(b) shows a correspondence between the value of the embedment information and the value of the remainder for the quadrangle as shown in FIG. 4(a).

Here, the number of the vertices of the extracted polygon is Z, a constant is N, the number of insertion points is Q, and the sum of Z and Q is W. The value of embedment information is M.

When such a correspondence among values Z, N, M, Q, and the value of the remainder exists, the value Q changes as the value M changes.

FIG. 4(b) shows an example in which, assuming Z=4 and N=4, each value of M=0, 1, 2 and 3 is embedded. If the number Q to be inserted is determined such that the value of the remainder is 0, 1, 2, and 3, respectively, the number Q is obtained such that Q=0, 1, 2 and 3, respectively.

When an extracted polygon is a quadrangle and a constant N has a value of 4, FIG. 5 shows examples that a point is inserted on a side of the quadrangle using the correspondence of FIG. 4(b).

In FIGS. 5(a), (b), (c), (d), and (e), points Pi (i=1, 2, 3, 4) are four extracted vertices, and points Qi (i=1, 2, 3) are insertion points.

FIG. 5(a) shows that the extracted polygon is a quadrangle (vertices: P1, P2, P3, P4), and the polygon is before being embedded.

FIG. 5(b) shows an example that information "0" is embedded when the constant N=4. This example corresponds to the case of embedding information "0" in FIG. 4(b). Here, the remainder of W of a value "4" divided by N of a value "4" is "0", and, a value of the embedment information M is "0."

FIG. 5(c) shows an example that information "1" is embedded when the constant N=4. This example corresponds to the case of embedding information "1" in FIG. 4(b). Here, the remainder of W of a value "5" divided by N of a value "4" is "1", and, a value of the embedment information M is "1." Therefore, as shown in FIG. 5(c), the middle point of the side P1P2 is chosen as an insertion point Q1.

FIG. 5(d) shows an example that information "2" is embedded when the constant N=4. This example corresponds to the case of embedding information "2" in FIG. 4(b). Here, the remainder of W of a value "6" divided by N of a value "4" is "2", and, a value of the embedment information M is "2." Therefore, as shown in FIG. 5(d), the middle point Q1 of the side P1P2 and the middle point Q2 of the side P2P3 are chosen as insertion points.

FIG. 5(e) shows an example that information "3" is embedded when the constant N=4. This example corresponds to the case of embedding information "3" in FIG. 4(b). Here, the remainder of W of a value "7" divided by N of a value "4" is "3", and, a value of the embedment information M is "3." Therefore, as shown in FIG. 5(e), the middle point Q1 of the side P1P2, the middle point Q2 of the side P2P3, and the middle point Q3 of the side P3P4 are chosen as insertion points.

Next, a case where an extracted polygon is a pentagon is explained. The present invention is similarly applicable to a polygon more than a pentagon, such as a hexagon.

The pentagon of FIG. 6(a) has five vertices of P1 (0,100), P2 (0, 0), P3 (100, 0), P4 (120, 50), and P5 (100,100).

For the pentagon as shown in FIG. 6(a), FIG. 6(b) shows a variation of the number of points to be inserted as the value of the embedment information is changed.

Values M, Z, Q, W, and the remainder of FIG. 6(b) are same as in FIG. 4(a).

FIG. 6(b) shows an example in which, assuming Z=5 and N=4, each value of M=0, 1, 2 and 3 is embedded. If the number Q to be inserted is determined such that the value of the remainder is 0, 2, 1, and 3, respectively, the number Q is obtained such that Q=3, 1, 0 and 2, respectively.

When an extracted polygon is a pentagon and a constant N=4, FIG. 7 shows examples that a point is inserted on a side of the pentagon using the correspondence of FIG. 6(b).

Figure 7A:
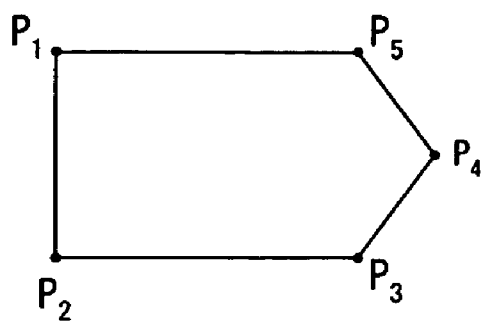
FIG. 7(a) to FIG. 7(e) are explanatory drawings of examples of embedding embedment information according to Embodiment 1 of the present invention.

In FIGS. 7(a), (b), (c), (d), and (e), points Pi (i=1, 2, 3, 4, 5) are five extracted vertices, and points Qi (i=1, 2, 3) are insertion points.

FIG. 7(a) shows that the extracted polygon is a pentagon (vertices: P1, P2, P3, P4, and P5), indicating a state before embedment.

Figure 7B:
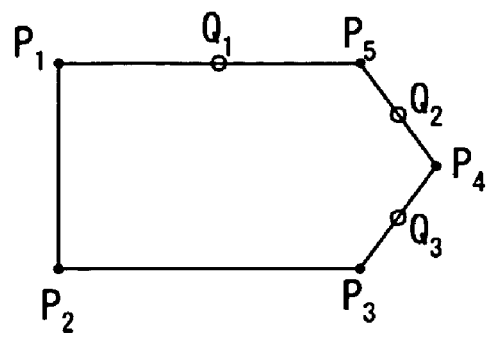

FIG. 7(b) shows an example that information "0" is embedded when the constant N=4. This example corresponds to the case of embedding information "0" in FIG. 6(b). Here, the remainder of W of a value "8" divided by N of a value "4" is "0", a value of the embedment information M is "0", and the number of insertion points Q is "3."

Therefore, as shown in FIG. 7(b), the middle point Q1 of the side P1P5, the middle point Q2 of the side P4P5, and the middle point Q3 of the side P3p4 are chosen as insertion points.

Figure 7C:
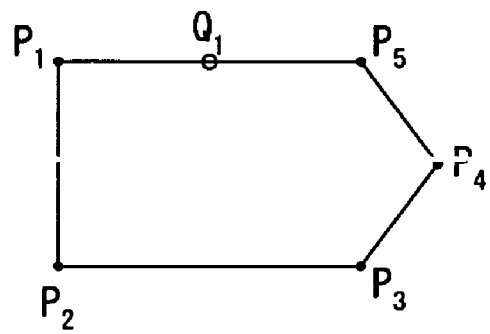

FIG. 7(c) shows an example that information "1" is embedded when the constant N=4. This example corresponds to a case of embedding information "1" in FIG. 6(b). Here, the remainder of W of a value "6" divided by N of a value "4" is "2", a value of the embedment information M is "1", and the number of the insertion point Q is "1." Therefore, as shown in FIG. 7(c), the middle point Q1 of the side P1P5 is chosen as an insertion point.

Figure 7D:
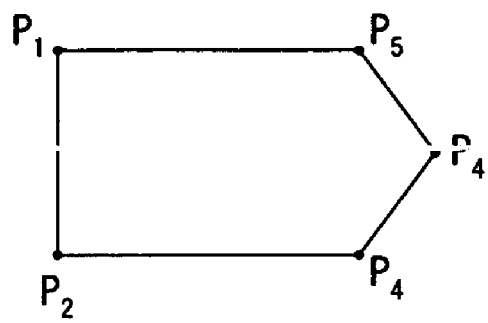

FIG. 7(d) shows an example that information "2" is embedded when the constant N=4. This example corresponds to a case of embedding information "2" in FIG. 6(b). Here, the remainder of W of a value "5" divided by N of a value "4" is "1", a value of the embedment information M is "2", and the number of the insertion points Q is "0." Therefore, there is no insertion point in this case.

Figure 7E:
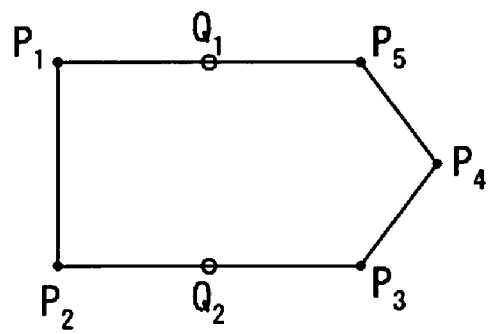

FIG. 7(e) shows an example that information "3" is embedded when the constant N=4. This example corresponds to the case of embedding information "3" in FIG. 6(b).

Here, the remainder of W of a value "7" divided by N of a value "4" is "3", a value of the embedment information M is "3", and the number of insertion points Q is "2." Therefore, as shown in FIG. 7(e), the middle point Q1 of the side P1P5 and the middle point Q2 of the side P2P3 are chosen as insertion points.

The present embodiment can be changed as follows.

(Modification point 1) A correspondence between remainder and embedment information may be changed.

(Modification point 2) When there is no object to embed on a side of a polygon, an insertion point may be inserted in a location apart from the side.

According to the present embodiment, there is the following effectiveness.

(Effectiveness 1) It is not necessary to set up a reference parameter and a variable parameter like the conventional example.

(Effectiveness 2) By inserting a point on a side of a polygon, changing of a shape of polygon before and after insertion can be suppressed.

(Effectiveness 3) Even when a malicious third person tries to move one or more vertices among the vertices which constitute a polygon, to falsify vector data and to erase embedment information, such an operation can be made ineffective. It is because the number of vertices cannot be changed even when the malicious third person moves the vertices of the polygon and there is no problem in holding the embedment information and subsequent reading.

Embodiment 2

Figure 8:
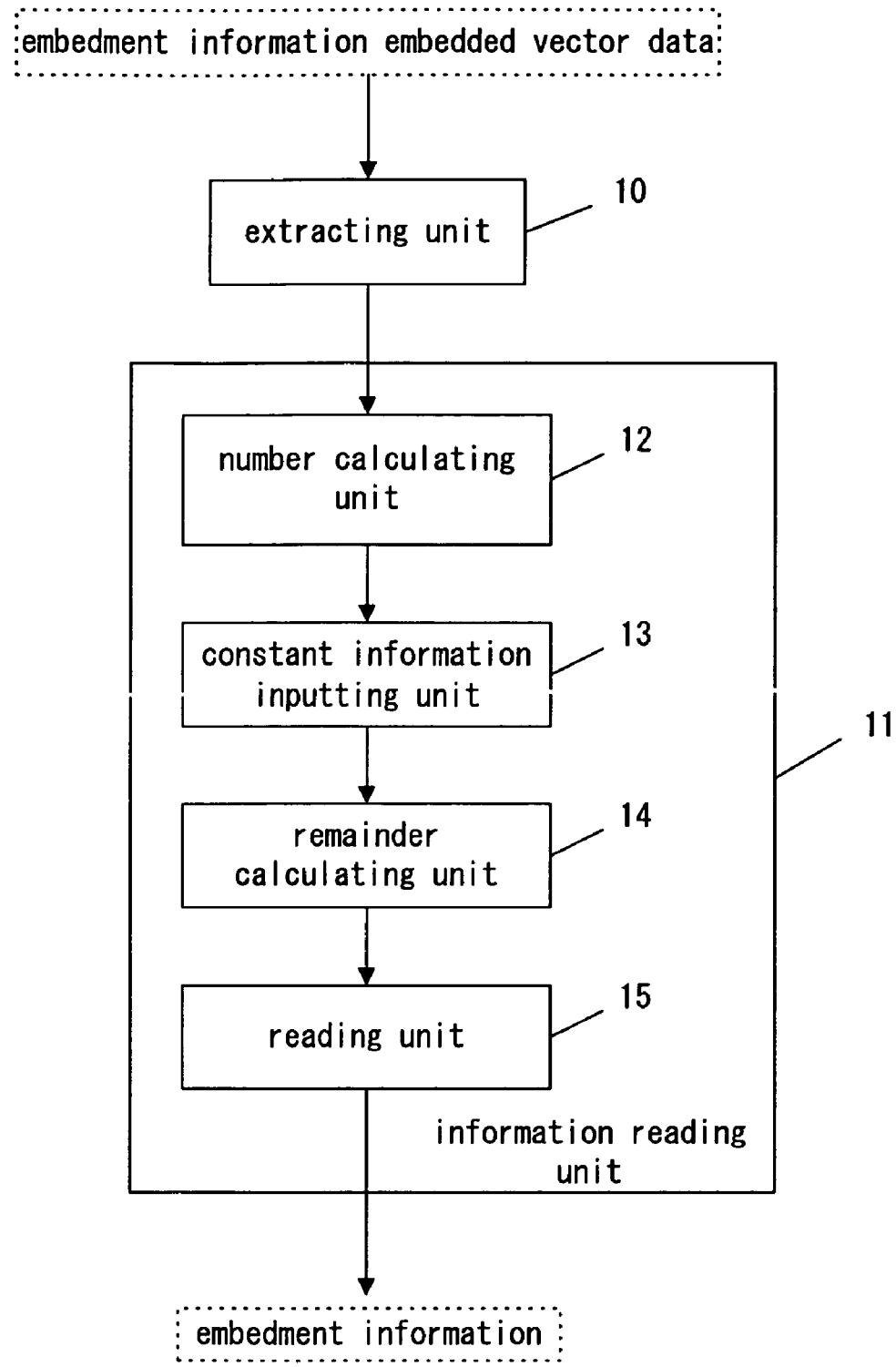
FIG. 8 is a functional block diagram of an information reading device according to Embodiment 2 of the present invention.

FIG. 8 is a functional block diagram of an information reading device according to Embodiment 2 of the present invention.

As shown in FIG. 8, this information reading device comprises an extracting unit 10 and an information reading unit 11. The information reading unit 11 comprises a number calculating unit 12, a constant information inputting unit 13, a remainder calculating unit 14, and a reading unit 15.

The extracting unit 10 extracts a polygon from vector data in which embedment information is embedded and further extracts vertices of the extracted polygon.

The number calculating unit 12 calculates the number of vertices of the polygon.

The constant information inputting unit 13 inputs a constant N which is an integer of two or more.

The remainder calculating unit 14 calculates a remainder by dividing the number calculated by the number calculating unit 12 with the constant N which is inputted by the constant information inputting unit 13.

The reading unit 15 reads embedment information from this remainder.

FIG. 9 is a flowchart of the information reading device according to Embodiment 2 of the present invention.

At Step 20, the extracting unit 10 extracts a polygon from vector data.

At Step 21, the number calculating unit 12 calculates the number of vertices of the extracted polygon.

At Step 22, the constant information inputting unit 13 inputs a constant N.

At Step 23, the remainder calculating unit 14 calculates a remainder of the number of vertices divided by the constant N.

At Step 24, the reading unit 15 reads embedment information based on this remainder.

Here, it is defined that the number of points which exist on sides of the extracted polygon is W, and that a value of embedment information is M. Corresponding to Embodiment 1, tables shown in FIG. 10(a) and FIG. 10(b) are prepared regarding a quadrangle in Embodiment 2. FIG. 10(a) shows a correspondence between a value of remainder of the number W divided by a constant N and a value of embedment information M, when the value of N is "4." Moreover, the correspondence as shown in FIG. 10(a) is arranged as digital-watermarking key information on both sides of the embedding device and the reader.

For example, when the number W of vertices of the extracted polygon is "5", a value of the remainder R calculated by the value N of "4" is "1", and the reading unit 15 reads that a value of the embedment information M is "1" using the correspondence of FIG. 10(b).

Moreover, the number of vertices of the polygon before insertion is "4", and FIG. 10(b) shows that the number Q of the insertion points is "1." Furthermore, fundamentally the same processing as mentioned above can be performed as for a pentagon.

According to the present embodiment, there is the following effectiveness.

(Effectiveness 1) Embedment information can be read using the correspondence shown in FIG. 10(a) and FIG. 10(b).

(Effectiveness 2) Since the correspondence including the number of vertices of the polygon is used as shown in FIG. 10(b), not only the value of the embedment information but the number of insertion points becomes clear.

Furthermore, each component of the information embedding device and the information reading device, according to Embodiments 1 and 2 or all the other Embodiments to be mentioned later, can be constructed as a program, can be installed in a computer, or can be made it circulated via a network.

Figure 11:
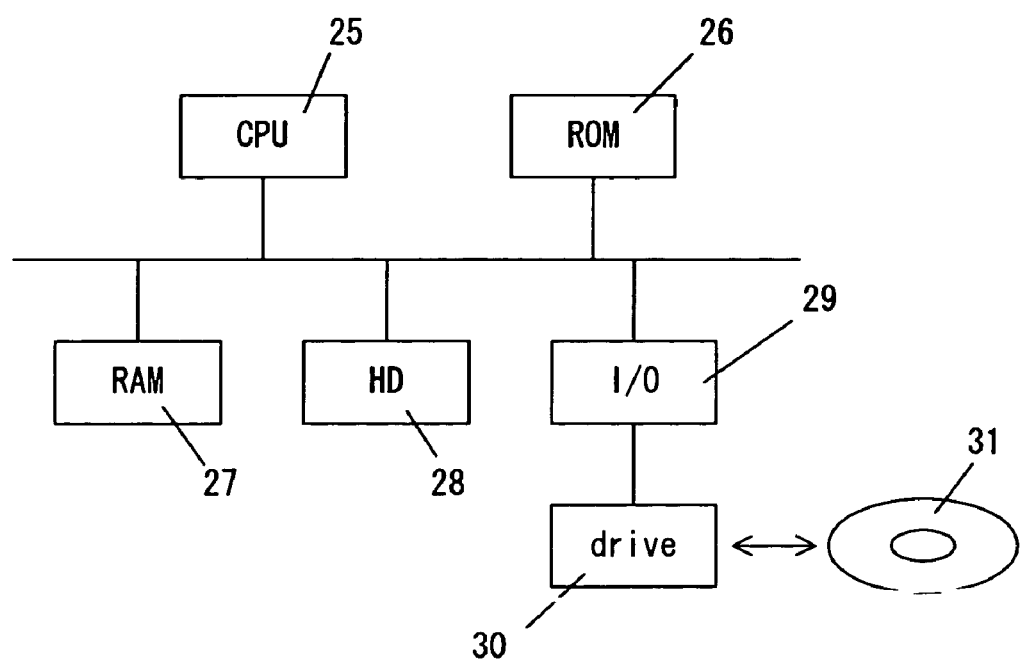
FIG. 11 is a block diagram illustrating the information embedding device/information reading device according to Embodiment 2 of the present invention.

As shown in FIG. 11, this program is typically stored in a recording media 31 such as a CD-ROM and a flexible disk, and is installed in a storing device 28 such as a hard disk via a drive 30 and an I/O 29.

When a CPU 25 executes this program accessing a ROM 26, a RAM 27, and the hard disk 28, the information embedding device and the information reading device in each embodiment mentioned above are realized.

Embodiment 3

Figure 12:
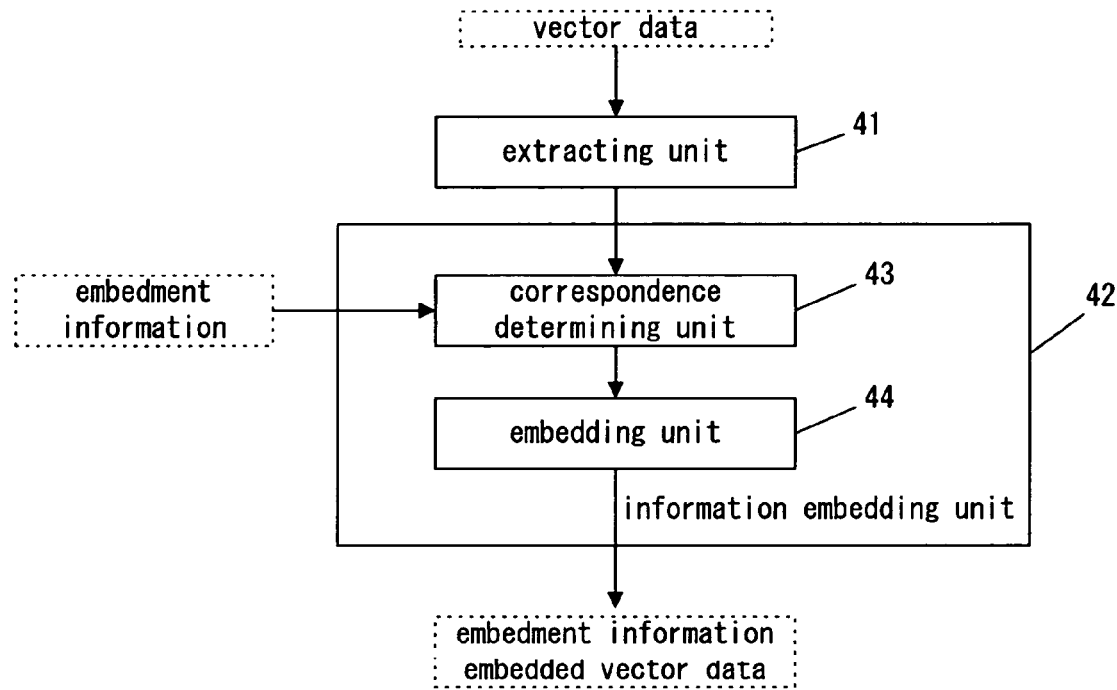
FIG. 12 is a functional block diagram of an information embedding device according to Embodiment 3 of the present invention.

FIG. 12 is a functional block diagram of the information embedding device in Embodiment 3 of the present invention. This information embedding device comprises an extracting unit 41 and an information embedding unit 42. The information embedding unit 42 comprises a correspondence determining unit 43 and an embedding unit 44.

Similar to Embodiment 1, the extracting unit 41 inputs vector data, and extracts vertices of a polygon included in the vector data.

Regarding a plurality of geometrical elements, the correspondence determining unit 43 determines the correspondence between the value of embedment information and the plurality of geometrical elements. The plurality of geometrical elements are chosen from a group that consists of a diagonal of the polygon, a center of gravity of the polygon, vertices of the polygon, and a representative point of the polygon. In the present embodiment, the diagonal of the polygon and the center of gravity of the polygon are chosen.

The correspondence of the geometrical elements can be expressed by either one of "distance between the diagonal of the polygon and the center of gravity of the polygon", "distance between the diagonal of the polygon and the representative point of the polygon" and "distance between the center of gravity of the polygon and the representative point of the polygon".

In the present embodiment, the correspondence is expressed by "distance between the diagonal of the polygon and the center of gravity of the polygon".

When embedment information is binary, a threshold T is defined for a distance chosen from the plurality of distances mentioned above. It is assumed that if the chosen distance mentioned above is shorter than T, information "0" is embedded; and if the chosen distance mentioned above is longer than T, information "1" is embedded. This is the correspondence of the present embodiment.

The embedding unit 44 performs embedding by changing the representative point of the polygon based on the correspondence determined by the correspondence determining unit 43. The representative point may be a vertex and a point that does not indicate the geometric property of the polygon (for example, a point only attached to the polygon). The representative point in the present embodiment is the center of gravity of the polygon.

Figure 13:
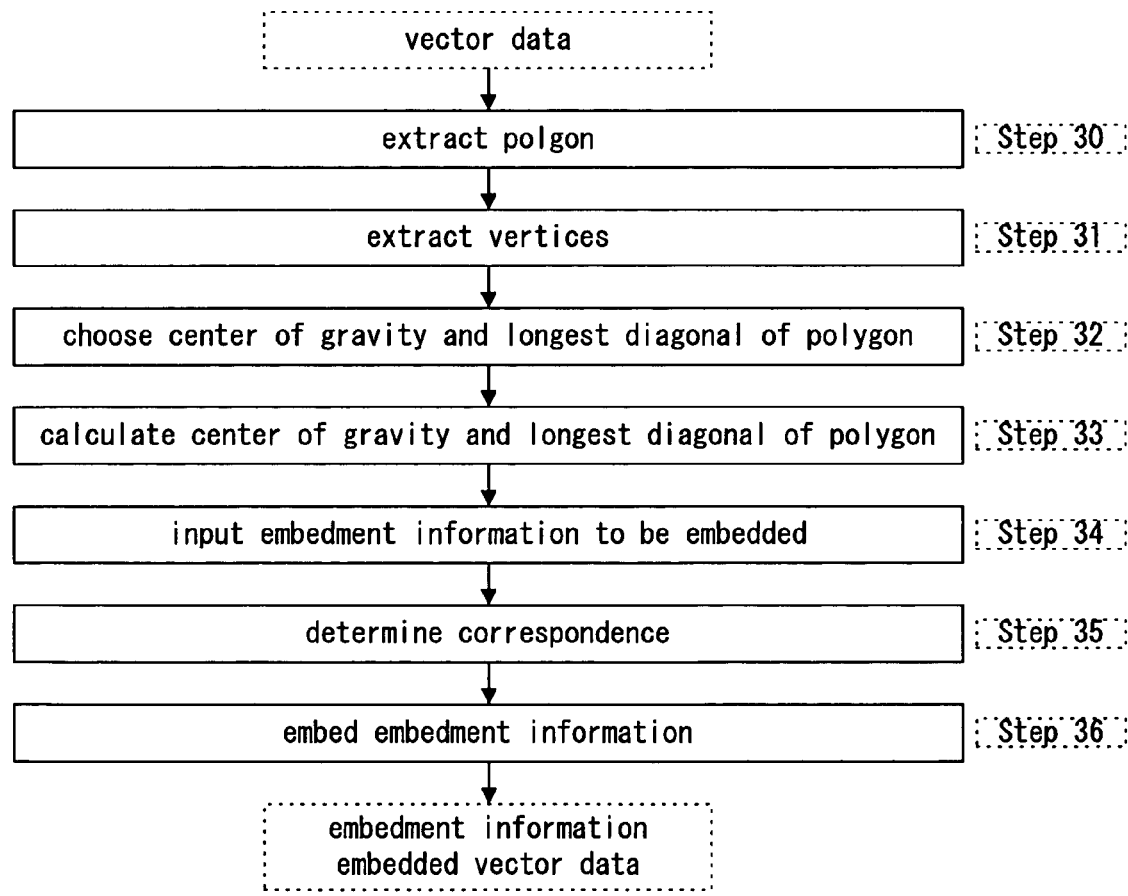
FIG. 13 is a flowchart of the information embedding device according to Embodiment 3 of the present invention.

FIG. 13 is a flowchart of the information embedding device in Embodiment 3 of the present invention. At Step 30, the extracting unit 41 extracts a polygon from the inputted vector data. At Step 31, the extracting unit 41 extracts vertices of the polygon.

At Step 32, the correspondence determining unit 43 determines the center of gravity and the longest diagonal of the polygon as geometrical elements of the polygon. At Step 33, the correspondence determining unit 43 determines the coordinates of the center of gravity and the longest diagonal of the extracted polygon.

At Step 34, the correspondence determining unit 43 inputs embedment information, and determines the correspondence between the embedment information and the geometrical element at Step 35. At Step 36, when the embedment information is "0", the correspondence determining unit 43 defines the coordinates of a specific vertex among the vertices of the polygon, in order to make the distance between the center of gravity of the polygon and the longest diagonal shorter than the threshold T (the distance is zero in the present embodiment). At Step 36, when the embedment information is "1", the correspondence determining unit 43 defines the coordinates of the specific vertex among the vertices of the polygon, in order to make the distance between the center of gravity of the polygon and the longest diagonal longer than the threshold T.

In addition, the advantage of choosing the longest diagonal is being able to uniquely specify a diagonal except for a case where a plurality of diagonals of the same length exist.

Figure 14A:
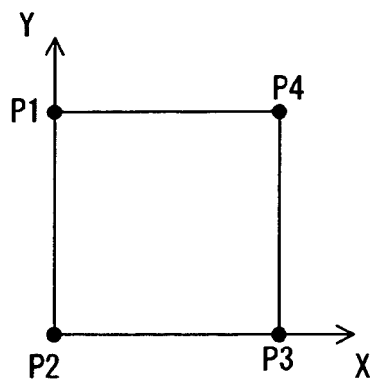
FIG. 14(a) to FIG. 14(c) are illustrations of polygons according to Embodiment 3 of the present invention.
Figure 14B:
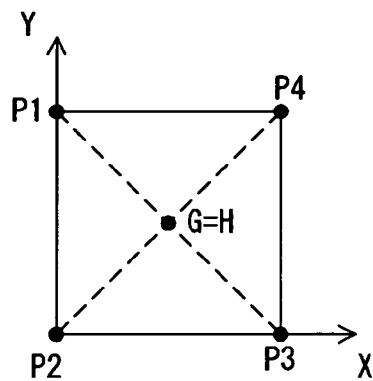
Figure 14C:
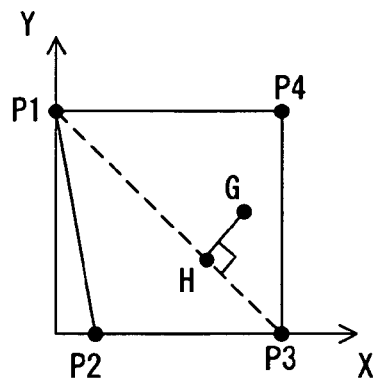

FIGS. 14(a) to 14(c) show a process of embedding embedment information in Embodiment 3 of the present invention.

FIG. 14(a) illustrates a polygon before the embedment information is embedded. In this example, the polygon is a quadrangle with four vertices P1 (0,100), P2 (0, 0), P3 (100, 0), and P4 (100,100).

When the polygon is a quadrangle, the plurality of geometrical elements in the present embodiment are the longest diagonal of the quadrangle and the center of gravity of the quadrangle. In the quadrangle P1P2P3P4 of FIG. 14(a), the longest diagonal is P1P3 (=P2P4). Moreover, the center of gravity G of the quadrangle P1P2P3P4 has the coordinates (50, 50).

As arrangement information of the geometrical elements, the distance between the center of gravity G and the longest diagonal P1P3 is determined. The distance between the center of gravity G and the longest diagonal P1P3 is a length from the center of gravity G to a foot H of a perpendicular dropped from the center of gravity G to the longest diagonal P1P3.

Here, this distance is determined using the following formula.

$$GH = ((X_G - X_H)^2 + (Y_G - Y_H)^2)^{1/2} \quad \text{(Formula 1)}$$

where the coordinates of G, H are $(X_G, Y_G)$ and $(X_H, Y_H)$.

Generally the range of the value that this distance can take is an arbitrary real number equal to or greater than "0". Here, it is assumed that the embedment information is "0" or "1", and the threshold T is introduced (T=1 in the present embodiment).

It is further assumed that, when the embedment information is "0", this distance is shorter than the threshold T; and when the embedment information is "1", this distance is longer than the threshold T.

More concretely, a vertex related to the distance between the center of gravity G and the longest diagonal P1P3 (the vertex P2 in an example of FIG. 4(c)) is controlled so as to make the distance between the center of gravity G and the longest diagonal P1P3 equal to or greater than the value "0" and equal to or smaller than the threshold T of "1" when the embedment information is "0", and to make the distance between the center of gravity G and the longest diagonal P1P3 greater than the threshold T of "1" when the embedment information is "1".

FIG. 14(b) shows an example which the embedment information "0" is embedded. In this example, since the center of gravity G is on the longest diagonal P1P3, the distance between the center of gravity G and the longest diagonal P1P3 is "0."

FIG. 14(c) shows an example in which the embedment information "1" is embedded. After embedding, the center of gravity G of the quadrangle P1P3P4P5 (a vertex P1 (0,100), P2 (20,0), P3 (100, 0), and P4 (100,100)) has the coordinates (55, 50), and the longest diagonal is P1P3. Therefore, the distance between the center of gravity G and the longest diagonal P1P3 is "3.5" (>T).

The present embodiment can be changed as follows.

(1) The vertex is controlled so as to change the center of gravity while the location of the longest diagonal is maintained. To the contrary, the vertex may be controlled so as to change the location of the diagonal (but keeping the longest nature) while the location of the center of gravity is maintained.

(2) The embedment information ("0", "1") may be replaced.

(3) Although the value of the threshold T is set to "1", the value can be substituted by an arbitrary value equal to or greater than "0", instead of "1".

Figure 15A:
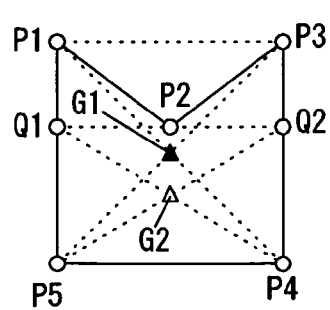
FIG. 15(a) and FIG. 15(b) are explanatory drawings of the center of gravity according to Embodiment 3 of the present invention.

(4) In the example of FIG. 14, the center of gravity G has been determined using all coordinates of the vertices of the polygon. However, a center of gravity of a circumscribed rectangle and a center of gravity of an inscribed rectangle for the polygon may be used. For example, when the polygon is a pentagon P1P2P3P4P5 shown in FIG. 15(a), the center of gravity G1 of a circumscribed rectangle P1P3P4P5 may be determined. Or the center of gravity G2 of an inscribed rectangle Q1Q2P4P5 may be determined.

When using the center of gravity G1, the center of gravity is determined without using the vertex P2 that partially constitutes a polygon. Or when using the center of gravity G2, the center of gravity is determined using virtual vertices Q1 and Q2 that are not originally included in the vertices that constitute the polygon.

Figure 15B:
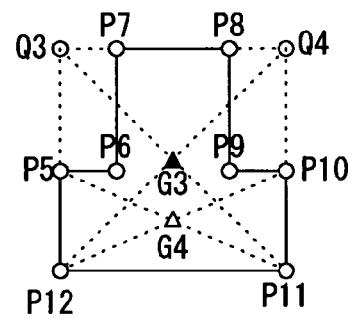

When the polygon is an octagon P5P6P7P8P9P10P11P12 shown in FIG. 15(b), the center of gravity G3 of the circumscribed rectangle Q3Q4P11P12 may be determined. Or the center of gravity G4 of the inscribed rectangle P5P10P11P12 may be determined.

When using the center of gravity G3, the center of gravity is determined by not using the vertices P5, P6, P7, P8, P9, and P10 that partially constitute the polygon, but using virtual vertices Q3 and Q4 that are not vertices of the polygon originally. Or when using the center of gravity G4, the center of gravity is determined without using the vertices P6, P7, P8, and P9 that partially constitute the polygon.

In any case, when determination of the center of gravity to be used, is defined uniquely, the determination of the center of gravity is set up arbitrarily. This point is similarly applicable to each embodiment mentioned later.

Embodiment 4

Figure 16:
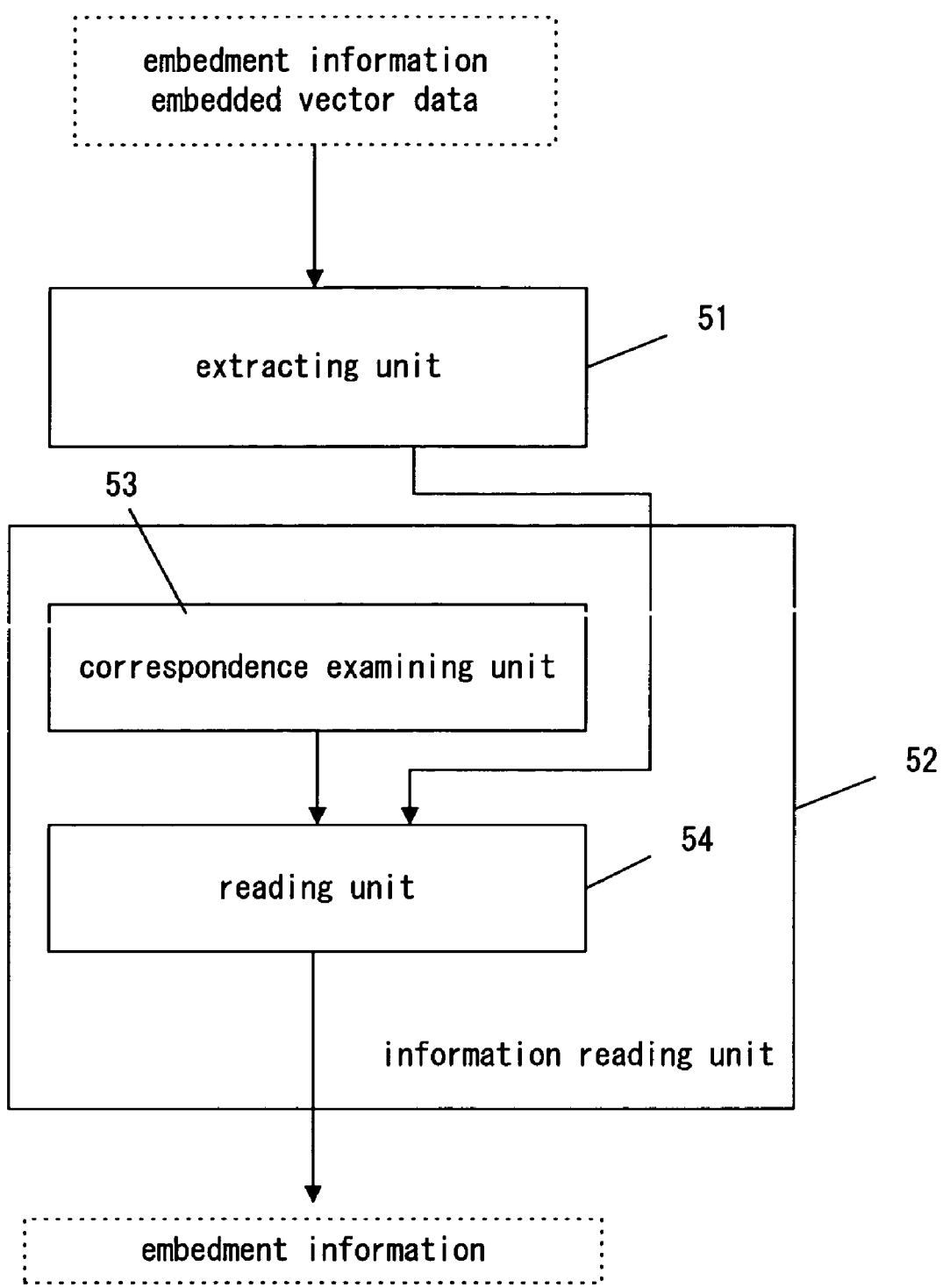
FIG. 16 is a functional block diagram of an information reading device in Embodiment 4 of the present invention.

FIG. 16 is a functional block diagram of the information reading device in Embodiment 4 of the present invention. This information reading device comprises an extracting unit 51 and an information reading unit 52. The information reading unit 52 comprises a correspondence examining unit 53 and a reading unit 54.

The extracting unit 51 inputs vector data (in which, embedment information according to Embodiment 3 is embedded) including the information of a polygon, and extracts the information of vertices that constitute the polygon from the vector data.

Next, the correspondence examining unit 53 examines the same correspondence as the correspondence determining unit 43 of Embodiment 3 uses. The geometrical elements in the correspondence are the center of gravity and the longest diagonal of the polygon. Of course, regarding the threshold T, the same threshold T as in Embodiment 3 is used here. In other words, the correspondence examining unit 53 determines the distance between the center of gravity and the longest diagonal of the polygon, and outputs the distance to the reading unit 54.

The reading unit 54 compares the distance and the threshold T which the correspondence examining unit 53 has determined, and reads the embedment information based on the comparison result. More concretely, when the distance is smaller than the threshold T, the information "0" is read. When the distance is greater than the threshold T, the information "1" is read.

Figure 17:
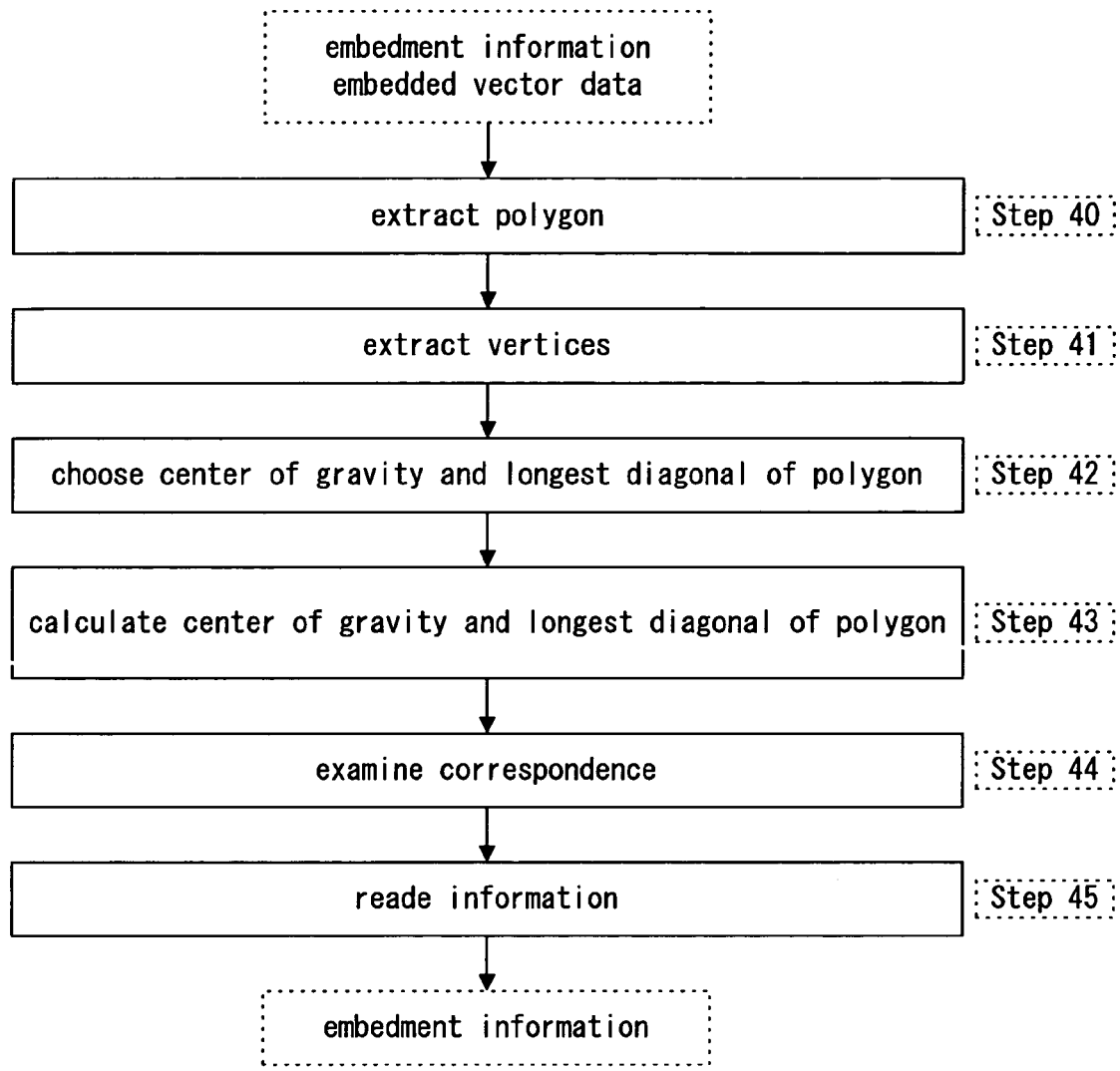
FIG. 17 is a flowchart of the information reading device according to Embodiment 4 of the present invention.

FIG. 17 is a flowchart of the information reading device in Embodiment 4 of the present invention. At Step 40, the extracting unit 51 extracts a polygon from the inputted vector data, and extracts vertices of the polygon at Step 41.

At Step 42, the correspondence examining unit 53 chooses the center of gravity and the longest diagonal of the polygon as the geometrical elements, and determines the center of gravity and the longest diagonal of the polygon at Step 43. At Step 44, the correspondence examining unit 53 examines the above-mentioned correspondence, calculates the above-mentioned distance, and outputs the distance to the reading unit 54.

At Step 45, the reading unit 54 performs the above-mentioned great-and-small comparison. As the result, the embedment information ("0" or "1") is read.

Figure 18A:
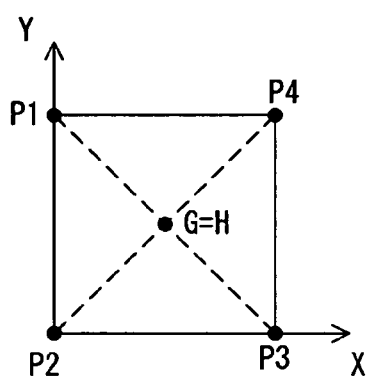
FIG. 18(a) and FIG. 18(b) are illustrations of polygons according to Embodiment 4 of the present invention.

As shown in FIG. 18(a), when the extracted polygon is a quadrangle P1P2P3P4 (vertices P1 (0,100), P2 (0, 0), P3 (100, 0), and P4 (100,100)), the longest diagonal is P1P3 (=P2P4). The center of gravity G of the quadrangle P1P2P3P4 has the coordinates (50, 50). The distance between the center of gravity G (50, 50) and the longest diagonal P1P3 is "0." Therefore, the value of the embedment information is judged to be "0."

Figure 18B:
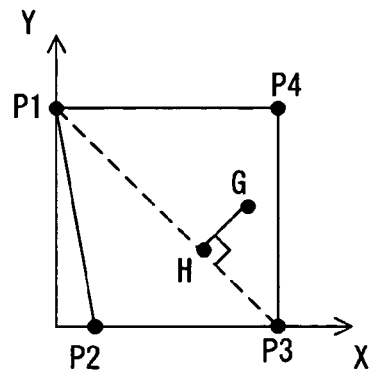

As shown in FIG. 18(b), when the extracted polygon is a quadrangle P1P2P3P4 (vertices P1 (0,100), P2 (20, 0), P3 (100, 0), and P4 (100,100)), the longest diagonal is P1P3. The distance between the center of gravity G (55, 50) and the longest diagonal P1P3 is "3.5" (>T). Therefore, the value of the embedment information is judged to be "1."

In addition, in Embodiments 1 and 2, when the range for the value of the embedment information is changed, it is also extensible to multiple values other than binary ("0" and "1"). For example, it is assumed that geometrical elements are a diagonal and the center of gravity, and N pieces of the embedment information (N is integer equal to or greater than two) are "0", "1" ... "N−1." Moreover, it is assumed that arrangement information of geometrical elements is distance between the two geometrical elements, that is, the information regarding the distance between the diagonal and the center of gravity. It is also assumed that the distance is expressed by d (d is a real number equal to or greater than zero). At this time, it is sufficient enough to define each correspondence such that "information "0" is embedded" corresponds to "an arrangement state of the diagonal and the center of gravity where d is equal to or greater than 0 and smaller than 1/N", "information "1" is embedded" corresponds to "an arrangement state of the diagonal and the center of gravity where d is equal to or greater than 1/N and smaller than 2/N", . . . , and "information "N" is embedded" corresponds to "an arrangement state of the diagonal and the center of gravity where d is equal to or greater than (N−1)/N."

According to Embodiment 2, there is the following effectiveness.

(Effectiveness 1) By changing the range of the value of the embedment information, it is extensible to multiple values other than binary ("0" and "1").

(Effectiveness 2) Since reading uses arrangement state of the geometrical elements, the resistance to rotation operation is high.

The present embodiment can be changed as follows.

(1) Embedment information ("0", "1") may be replaced.

(2) Although the value of the threshold T is set to "1", the value can be substituted by an arbitrary value equal to or greater than "0", instead of "1."

Embodiment 5

Figure 19:
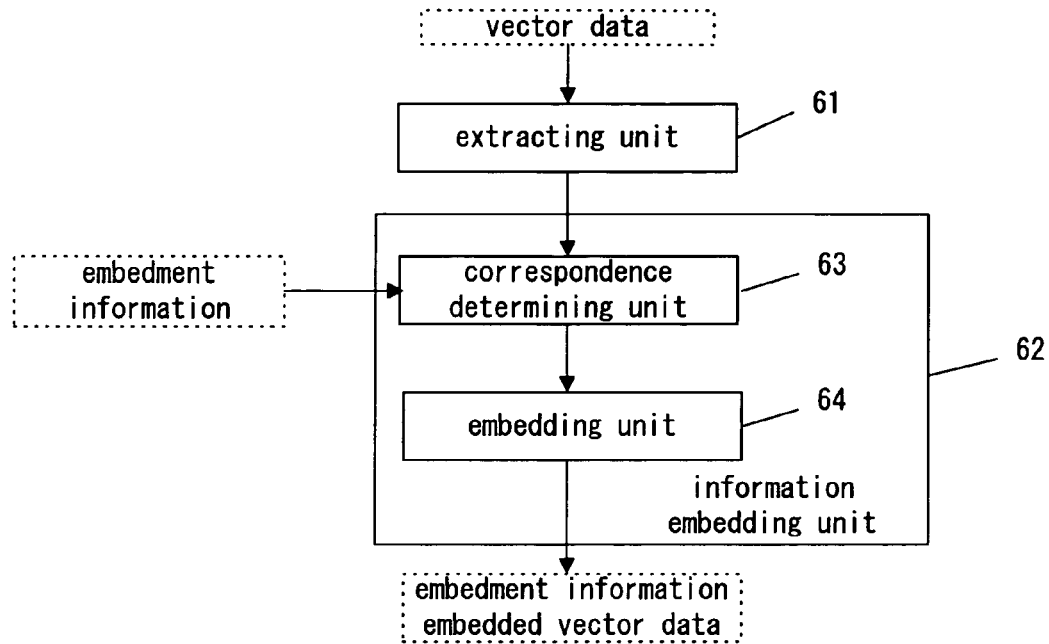
FIG. 19 is a functional block diagram of an information embedding device according to Embodiment 5 of the present invention.

FIG. 19 is a functional block diagram of the information embedding device in Embodiment 5 of the present invention. The information embedding device comprises an extracting unit 61 and an information embedding unit 62. The information embedding unit 62 comprises a correspondence determining unit 63 and an embedding unit 64. Similar to Embodiment 1, the extracting unit 61 inputs vector data and extracts vertices of a polygon included in the vector data.

The correspondence determining unit 63 chooses a geometrical element from a group which is constituted by a diagonal of the polygon, a center of gravity of the polygon and a representative point of the polygon, and determines correspondence of the chosen geometrical element with the arrangement information. In the present embodiment, it is assumed that the representative point is a facility location that is not directly related to the geometric property of the polygon. Here, for example, the facility means buildings, such as a house, a school, a hospital and so on. The facility location is a location where a name or an acronym of the facility, the appearance of which is shown by the polygon, is expressed in relation to the polygon.

Moreover, the geometrical element of the present embodiment is the center of gravity of the polygon. The correspondence is expressed by the distance between the center of gravity G and the facility location of the polygon. Regarding the distance, a threshold T similar to Embodiment 1 is defined (T=1 in the present embodiment). It is assumed that when the information "0" is embedded, the distance is set to be equal to or smaller than the threshold T; and when the information "1" is embedded, the distance is set to be greater than the threshold T. In addition, the correspondence determining unit 63 operates, in operating the distance, the facility location rather than the center of gravity G, the vertex, and so on.

Figure 20:
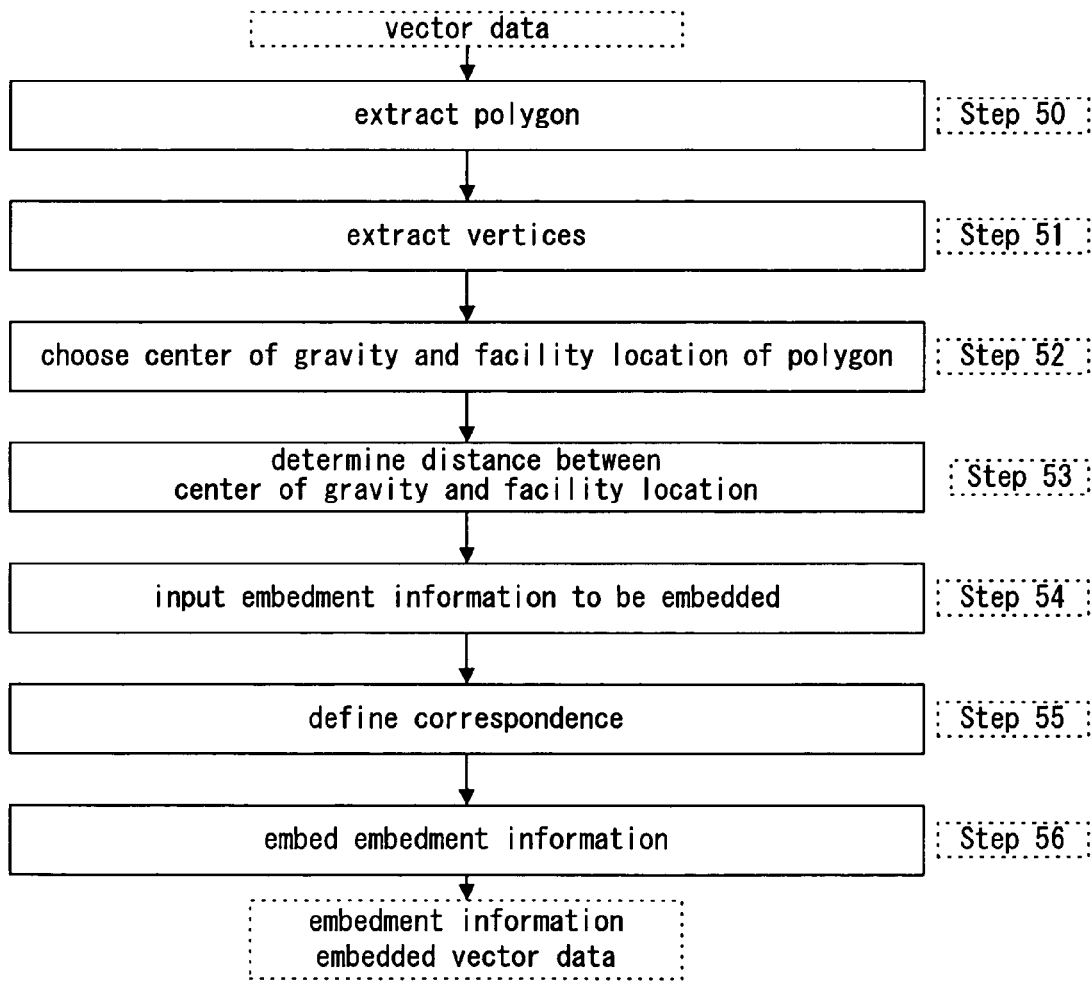
FIG. 20 is a flowchart of the information embedding device according to Embodiment 5 of the present invention.

FIG. 20 is a flowchart of the information embedding device in Embodiment 5 of the present invention. At Step 50, the extracting unit 61 extracts a polygon from the inputted vector data, and extracts vertices of the polygon, at Step 51.

At Step 52, the correspondence determining unit 63 chooses the center of gravity of the polygon as the geometrical element, and chooses the facility location as the representative point of the polygon. At Step 53, the correspondence determining unit 63 calculates the distance between the center of gravity and the facility location of the polygon.

At Step 54, the correspondence determining unit 63 inputs the embedment information, and determines the facility location of the extracted polygon according to the value of the embedment information that is inputted at Step 55. The correspondence determining unit 63 sets the distance to be equal to or smaller than the threshold T when embedding the embedment information "0"; and sets the distance to be greater than the threshold T when embedding the embedment information "1". The embedding unit 64 moves the facility location of the polygon to the facility location that is determined at Step 55. Thereby, the embedment information is embedded.

FIG. 21(a) illustrates the polygon (a quadrangle P1P2P3P4: vertices P1 (0,100), P2 (0, 0), P3 (100, 0), and P4 (100,100)) before the embedment information is embedded. This polygon possesses the facility location (coordinates: (30, 20)) as the representative point.

The center of gravity G of the quadrangle P1P2P3P4 of FIG. 21(a) has the coordinates (50, 50).

FIG. 21(b) shows an example that the embedment information "0" is embedded in the quadrangle of FIG. 21(a). The facility location has the coordinates (50, 50). The distance between the center of gravity G and the facility location is "0."

FIG. 21(c) shows an example that the embedment information "1" is embedded in the quadrangle of FIG. 21(a). The facility location has the coordinates (30, 20). The distance between the center of gravity G and the facility location is "36.1" (>T).

According to the present embodiment, reference is unnecessary while it was necessary in the conventional example.

The present embodiment may be changed as follows.

(1) Although the center of gravity is chosen as one of two geometrical elements, the diagonal may alternatively be chosen as one of two geometrical elements; thereby the embedment information can be embedded by the same operation.

(2) The embedment information ("0", "1") may be replaced.

(3) Although the coordinates of the facility location is changed, the location of the center of gravity may be changed instead. However, when changing the center of gravity, the shape of the quadrangle is changed since the coordinates of the vertex of the quadrangle are changed. Therefore, it is desirable to change the facility location.

(4) Although the value of the threshold T is set to "1", the value can be substituted by an arbitrary value that is equal to or greater than "0", instead of "1".

Embodiment 6

FIG. 22 is a functional block diagram of the information reading device in Embodiment 4 of the present invention. The information reading device of the present embodiment performs processing for vector data in which embedment information is embedded by the information embedding device in Embodiment 5. The information reading device comprises an extracting unit 71 and an information reading unit 72. The information reading unit 72 comprises a correspondence examining unit 73 and a reading unit 74.

The extracting unit 71 inputs the vector data (the embedment information is embedded according to Embodiment 5) including the information of the polygon, and extracts, from the vector data, the information of the vertices that constitute the polygon.

The correspondence examining unit 73 examines the same correspondence as in Embodiment 5. More concretely, the correspondence examining unit 73 calculates the distance between the center of gravity and the facility location, and outputs the distance to the reading unit 74. Of course, the same threshold T as in Embodiment 5 is used here.

The reading unit 74 reads the embedment information. More concretely, when the above-mentioned distance is equal to or smaller than the threshold T, the reading unit 74 reads the embedment information "0". When the above-mentioned distance is greater than the threshold T, the reading unit 74 reads the embedment information "1".

Figure 23:
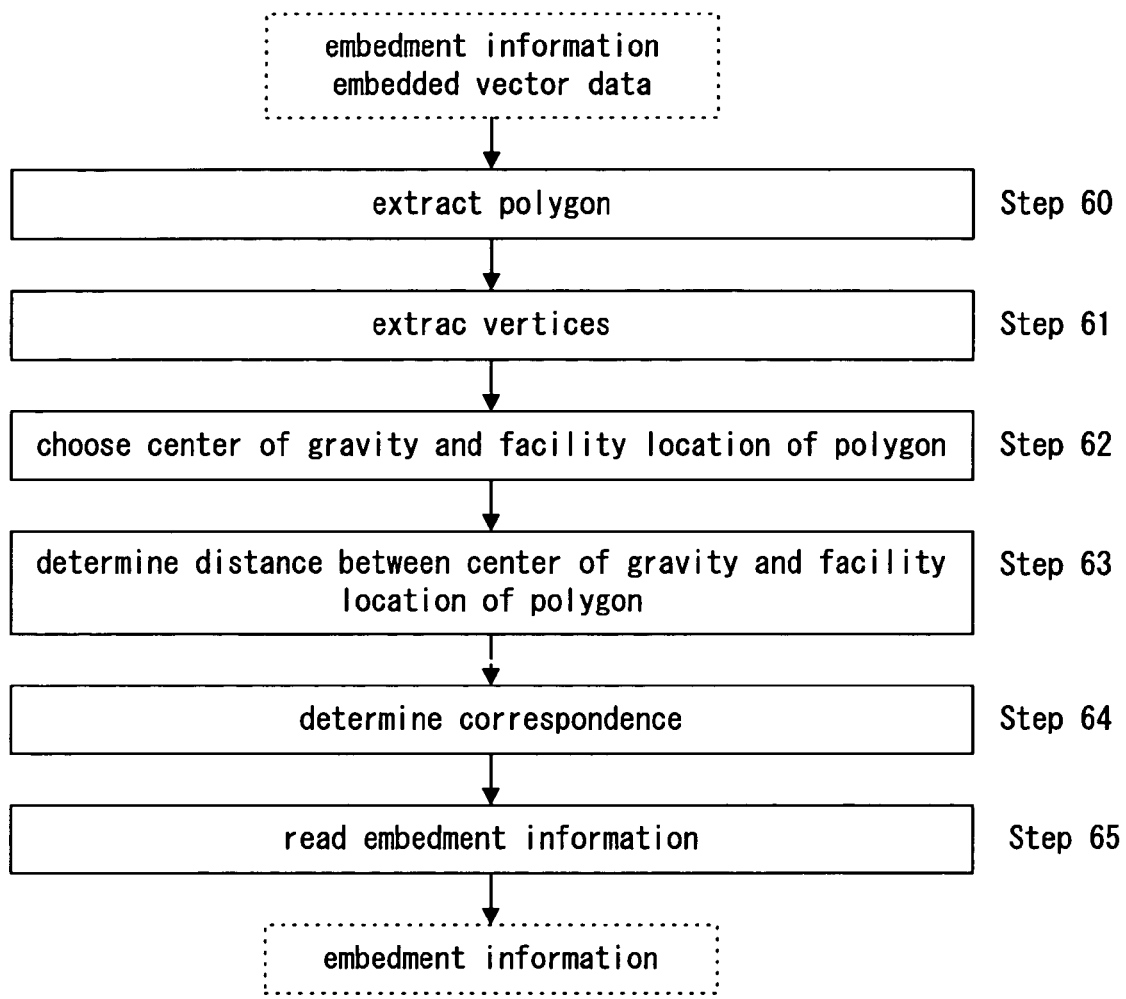
FIG. 23 is a flowchart of the information reading device according to Embodiment 6 of the present invention.

FIG. 23 is a flowchart of the information reading device in Embodiment 6 of the present invention.

At Step 60, the extracting unit 71 extracts a polygon from the inputted vector data, and extracts the vertices of the polygon at Step 61.

At Step 62, the correspondence examining unit 73 chooses the center of gravity of the polygon as a geometrical element, and chooses the facility location as a representative point of the polygon. At Step 63, the correspondence examining unit 73 calculates the distance between the center of gravity and the facility location of the polygon, and examines the correspondence at Step 64. At Step 65, the reading unit 74 reads the information embedment "0", when the distance is equal to or smaller than the threshold T, and reads the embedment information "1", when the distance is greater than the threshold T.

Figure 24A:
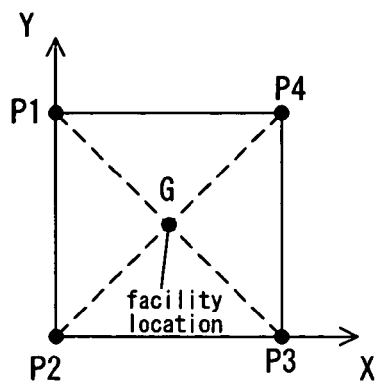
FIG. 24(a) and FIG. 24(b) are illustrations of polygons according to Embodiment 6 of the present invention.
Figure 24B:
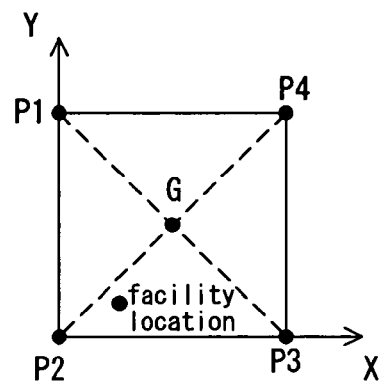

When the extracted polygon is, as shown in FIG. 24(*a*), a quadrangle P1P2P3P4 (vertices P1 (0,100), P2 (0, 0), P3 (100, 0), and P4 (100,100)) and the facility location has the coordinates (50, 50), the center of gravity G of the quadrangle P1P2P3P4 has the coordinates (50, 50). Moreover, the distance between the center of gravity G and the facility location is "0" (<T). Therefore, it is judged that the embedment information "0" is embedded.

When the extracted polygon, as shown in FIG. 24(*b*), is a quadrangle P1P2P3P4 (vertices P1 (0,100), P2 (0, 0), P3 (100, 0) and P4 (100,100)) and the facility location has the coordinates (30, 20), the center of gravity G of the quadrangle P1P2P3P4 has the coordinates (50, 50) and the distance between the center of gravity G and the facility location is "36.1" (>T). Therefore, it is judged that the embedment information "0" is embedded.

According to the present invention, by changing the range of the value of embedment information, it is also extensible to multiple values other than binary ("0" and "1"), similar to Embodiment 2.

The present embodiment can be changed as follows.

(1) Embedment information ("0", "1") may be changed.

(2) Although the value determining the range of the value of the embedment information is set to "1", the value can be substituted by an arbitrary value that is equal to or greater than "0", instead of "1".

(3) The range of the value which the distance can take can be changed. In other words, the arrangement information of the geometrical element can be changed.

Embodiment 7

Figure 25:
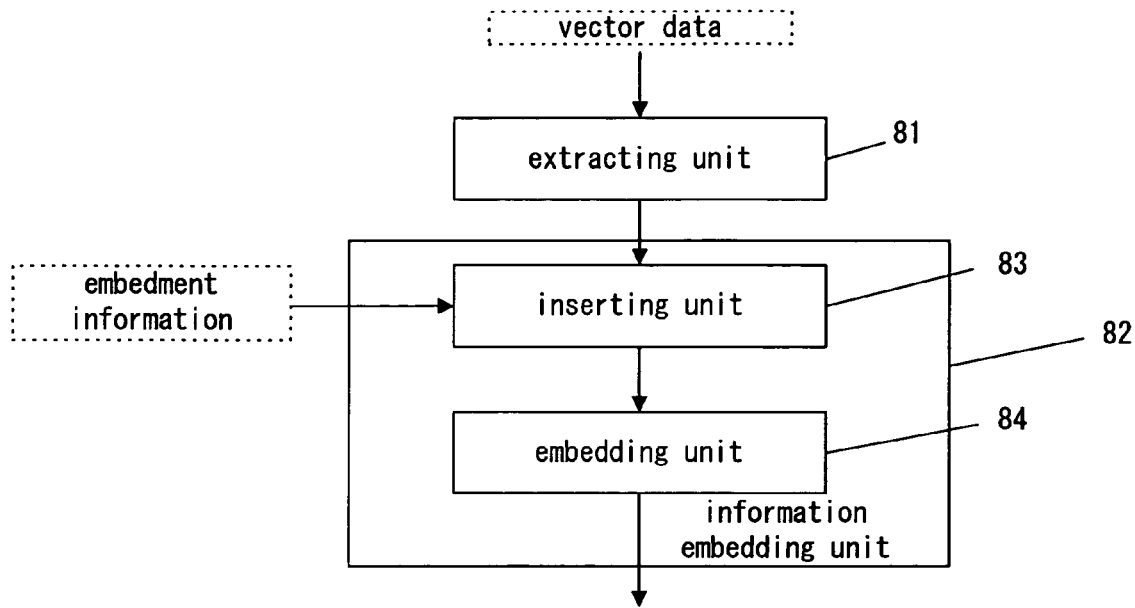
FIG. 25 is a functional block diagram of an information embedding device according to Embodiment 7 of the present invention.

FIG. 25 is a functional block diagram of the information embedding device in Embodiment 7 of the present invention. This information embedding device comprises an extracting unit 81 and an information embedding unit 82. The information embedding unit 82 comprises an inserting unit 83 and an embedding unit 84.

The extracting unit 81 inputs vector data including definition information of a polygon, and extracts a plurality of vertices which constitute the polygon.

The inserting unit 83 determines insertion points (the number is N; N=1 in the present embodiment) which should be inserted in between two vertices adjoining each other among the plurality of vertices that are extracted by the extracting unit 81. For example, when the polygon is a quadrangle, since the number of vertices of the polygon is "4", the number of the insertion points is "4".

The embedding unit 84 embeds all the insertion points that are determined by the inserting unit 83 in the extracted polygon.

Figure 27A:
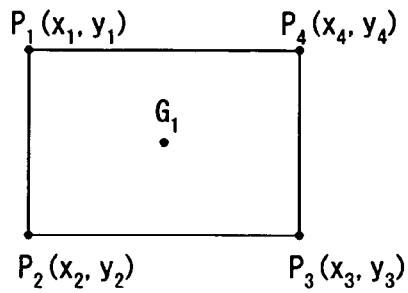
FIGS. 27(a), 27(b) and FIG. 27(c) are explanatory drawings of the center of gravity according to Embodiment 7 of the present invention.
Figure 27B:
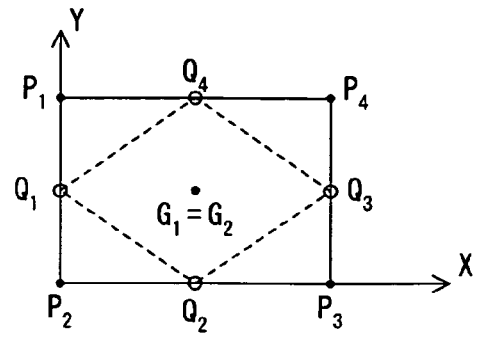
Figure 27C:
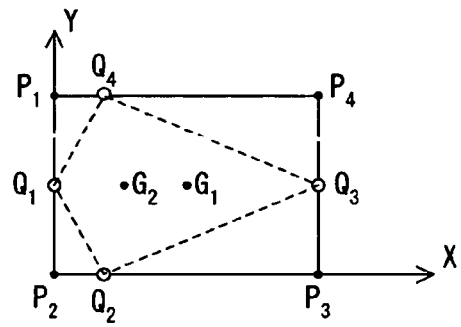

Next, referring to FIG. 27, relationship between an insertion point and embedment information is explained. Hereafter, it is assumed that the value of the embedment information is 1 bit ("0" or "1").

It is assumed that the polygon before embedding is a quadrangle P1P2P3P4 shown in FIG. 27(*a*). At this time, the center of gravity G1 of the quadrangle P1P2 P3P4 is nothing else but the intersection of the diagonals P1P3 and P2P4.

As shown in FIG. 27(*b*), when the insertion points Q1, Q2, Q3 and Q4 are the middle points of each segment P1P2, P2P3, P3P4, and P4P1 respectively, the center of gravity G2 of a quadrangle Q1Q2Q3Q4, which is constituted by the insertion points Q1, Q2, Q3, and Q4, is in agreement with the center of gravity G1 of the quadrangle P1P2P3P4.

In the present embodiment, a case where the center of gravity G1 and the center of gravity G2 are in agreement corresponds with a case where a value of embedment information is "0". In addition, in order to secure an acceptable range against an error etc., a small threshold T (for example, T=1) is introduced. When the distance between the centers of gravity G1 and G2 is equal to or smaller than the threshold T, it is considered that the two centers of gravity G1 and G2 are in agreement.

On the other hand, in FIG. 27(*c*), the center of gravity G2 of the quadrangle Q1Q2Q3Q4 that is constituted by the four insertion points Q1, Q2, Q3, and Q4 separates from the center of gravity G1. The distance between the centers of gravity G1 and G2 exceeds the threshold T. In the present embodiment, a case where the two centers of gravity G1 and G2 are not in agreement (more precisely, the distance between the centers of gravity G1 and G2 exceeds the threshold T) corresponds with a case where the value of the embedment information is "1".

Figure 26:
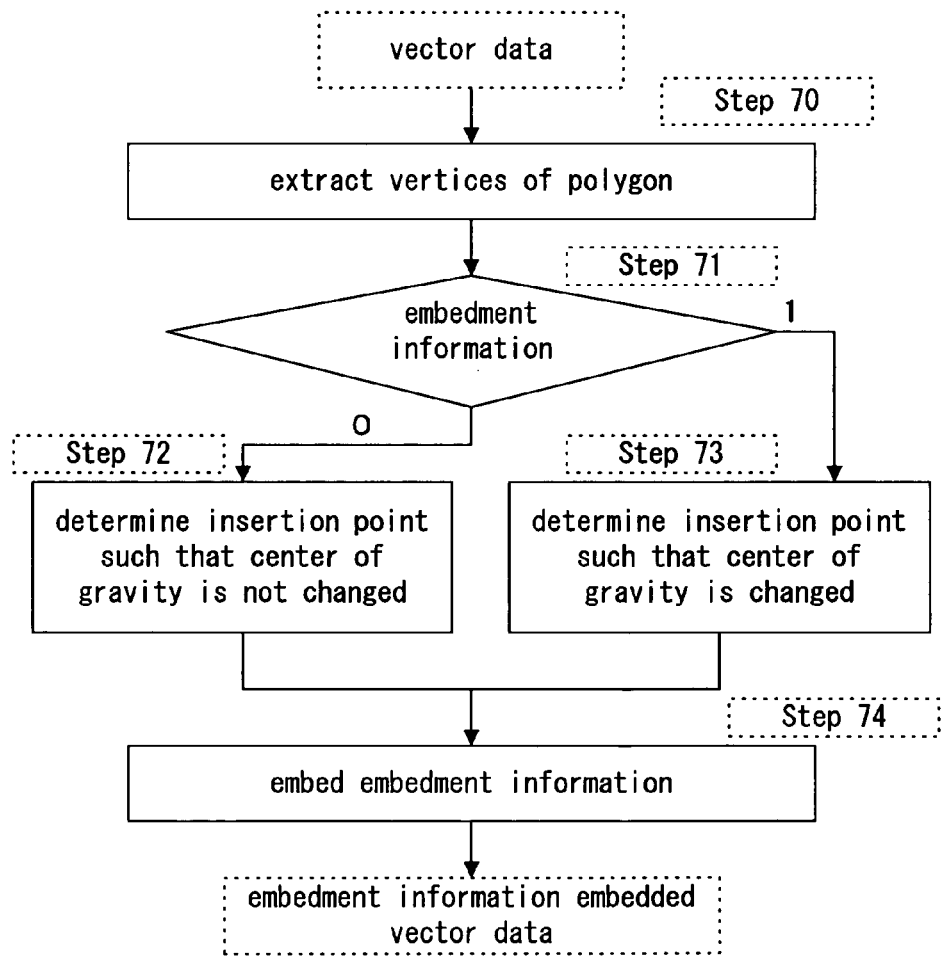
FIG. 26 is a flowchart of the information embedding device according to Embodiment 7 of the present invention.

In FIG. 26, the inserting unit 83 determines a plurality of insertion points so as to satisfy the above-mentioned relationship (the relationship between the value of the embedment information and the distance between the two centers of gravity).

FIG. 26 is a flowchart of the information embedding device in Embodiment 7 of the present invention. At Step 70, the extracting unit 81 extracts a plurality of vertices that constitute a polygon from vector data, and outputs the extracted information of the plurality of vertices to the inserting unit 83.

At Step 71, the inserting unit 83 checks the value of the embedment information. When the value is "0", the processing moves to Step 72, and when the value is "1", the processing moves to Step 73.

At Step 72, for example, as shown in FIG. 27(*b*), the inserting unit 83 determines all insertion points such that the center of gravity of the polygon constituted by the insertion points matches with the center of gravity of the extracted polygon.

At step 73, for example, as shown in FIG. 27(*c*), the inserting unit 83 determines all insertion points such that the center of gravity of the polygon constituted by the insertion points separates from the center of gravity of the extracted polygon as far as the distance that is greater than the threshold T.

At Step 74, the embedding unit 84 embeds the insertion points, which are determined by the inserting unit 83, into the extracted polygon, and outputs the result as the embedment information embedded vector data.

In the present embodiment, when inserting the insertion points, the insertion points are arranged on straight lines which connect each of the point P1 and the point P2, the point P2 and the point P3, the point P3 and the point P4, and the point P4 and the point P1, therefore, a change of shape from the data of embedment information to the original data can be avoided.

The present embodiment can be changed as follows.

(1) Although one new point is inserted in between each pair of extracted adjoining vertices, the present invention is not limited to the case. If the number of N of the insertion points is greater than "1", it may cope with a case where the embedment information is multi-valued.

(2) As the correspondence regarding embedding, the distance between the center of gravity G1 and the center of gravity G2 is set to be equal to or smaller than the threshold T when the embedment information "0" is embedded, and the distance between the center of gravity G1 and the center of gravity G2 is set to be greater than the threshold T when the embedment information "1" is embedded. However, when the embedment information "0" and "1" are exchanged, the same effectiveness can be acquired. Moreover, it is set that the threshold T=1, but the threshold T is not limited to the value.

(3) Regarding embedding processing, when the embedment information "0" is embedded, the insertion point Qi is inserted in each of the middle points of the point 1 and the point 2, the point 2 and the point 3, the point 3 and the point 4, and the point 4 and the point 1. When the embedment information "1", is embedded, the insertion point Qi is inserted in a place shifted from the middle point. However, the present invention is not limited to the case.

Embodiment 8

Figure 28:
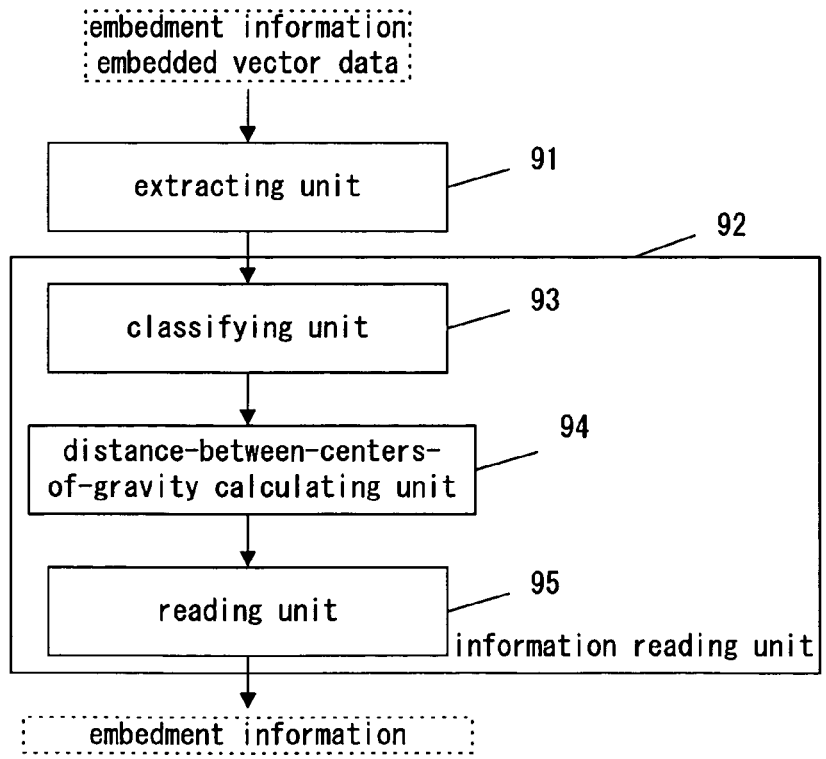
FIG. 28 is a functional block diagram of an information reading device according to Embodiment 8 of the present invention.

FIG. 28 is a functional block diagram of an information reading device in Embodiment 8 of the present invention. This information reading device comprises an extracting unit 91 and an information reading unit 92. The information reading unit 92 comprises a classifying unit 93, a distance-between-centers-of-gravity calculating unit 94, and a reading unit 95.

The extracting unit 91 inputs embedment information embedded vector data (one that the embedment information is embedded according to Embodiment 7), and extracts a plurality of points of the polygon from the vector data.

The information reading unit 92 reads the embedment information that is embedded based on the plurality of points extracted by the extracting unit 91.

A classifying unit 93 classifies the plurality of points extracted by the extracting unit 91 into a first set and a second set. The classifying unit 93 determines the center of gravity of a first figure that is constituted by the plurality of points belonging to the first set, and the center of gravity of a second figure that is constituted by the plurality of points belonging to the second set. In more detail, the classifying unit 93 gives the consecutive numbers to the plurality of points extracted by the extracting unit, and classifies the plurality of points extracted by the extracting unit according to whether the consecutive numbers are even or odd. The above-mentioned classification is possible because the number of the insertion points is N=1, as in Embodiment 7. When the number N is set to be greater than "1", the plurality of points extracted from the extracting unit are classified into the first set, the second set, . . . , and (N+1)th set.

The distance-between-centers-of-gravity calculating unit 94 calculates the distance between the center of gravity of the first figure and the center of gravity of the second figure.

The reading unit 95 reads the embedment information based on the distance calculated by the distance-between-centers-of-gravity calculating unit 94.

Figure 29:
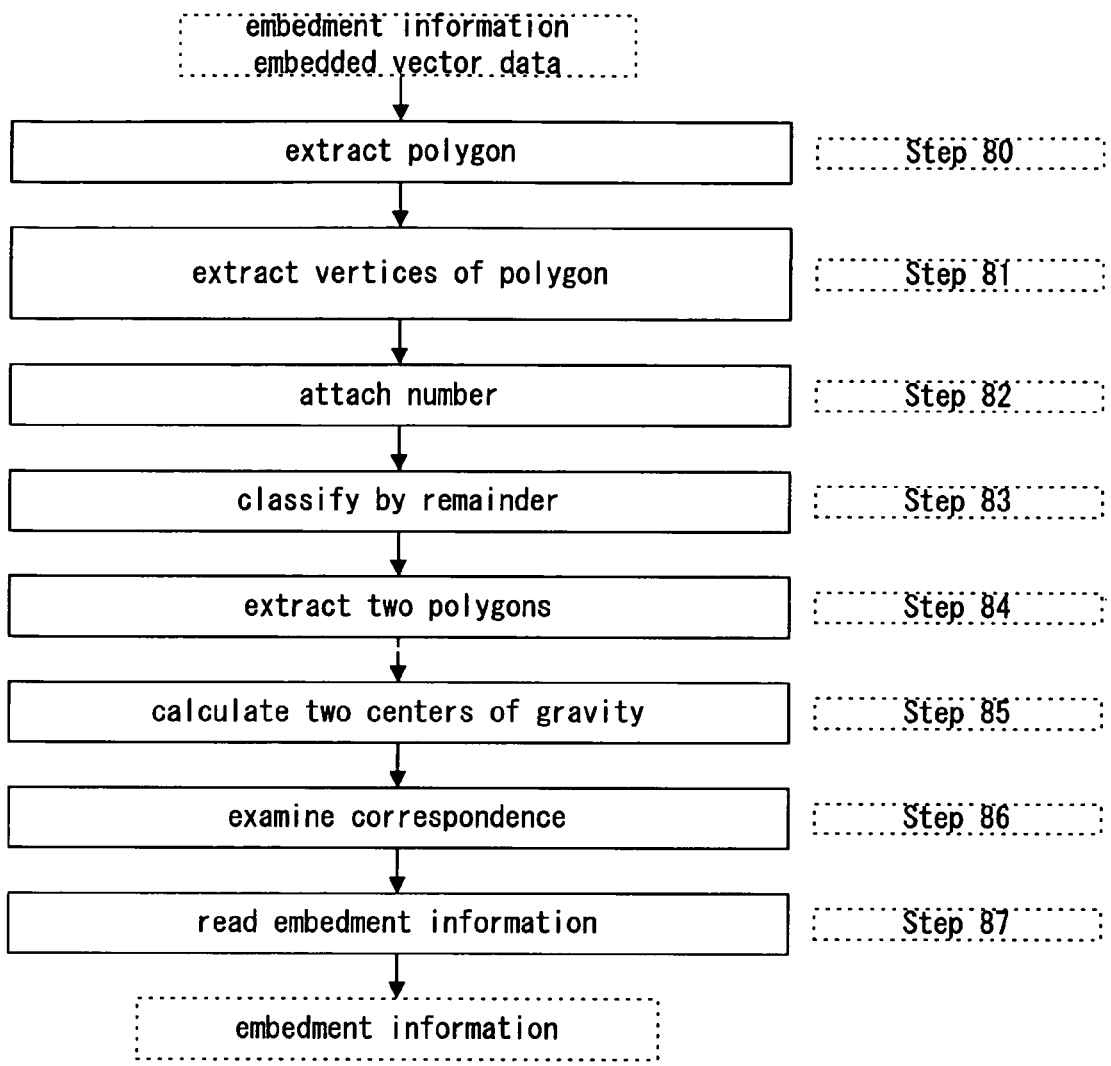
FIG. 29 is a flowchart of the information embedding device according to Embodiment 8 of the present invention.

FIG. 29 is a flowchart of the information reading device of the present embodiment. At Step 80, the extracting unit 91 extracts a polygon from the embedment information embedded vector data, and extracts a plurality of vertices from the extracted polygon. In addition, in this state, the vertices and the insertion points in Embodiment 7 are not distinguished; however, they are dealt as mere vertices.

At Step 81, the classifying unit 93 gives the consecutive number M (M=1, 2 . . . ) to each of the plurality of vertices. At Step 83, the classifying unit 93 classifies these vertices into two vertex groups according to whether the consecutive number M is even or odd. One of the vertex groups is a set whose elements are the vertices in Embodiment 7, and the other one is a set whose elements are the insertion points in Embodiment 7.

At Step 84, the classifying unit 93 considers a polygon composed by a vertex group belonging to one set as a first polygon, and a polygon composed by a vertex group belonging to the other set as a second polygon. Then, the classifying unit 93 outputs the information of the first and second polygons to the distance-between-centers-of-gravity calculating unit 94.

At Step 85, the distance-between-centers-of-gravity calculating unit 93 obtains the centers of gravity of the first and second polygons, calculates the distance between the centers of gravity (Step 85), and outputs the distance to the reading unit 95.

Figure 30A:
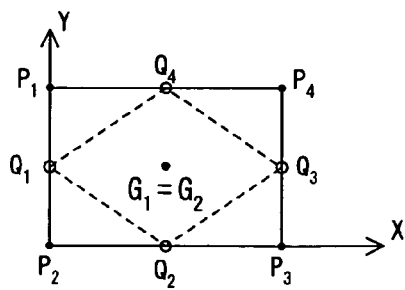
FIG. 30(a) and FIG. 30(b) are explanatory drawings of the center of gravity according to Embodiment 8 of the present invention.
Figure 30B:
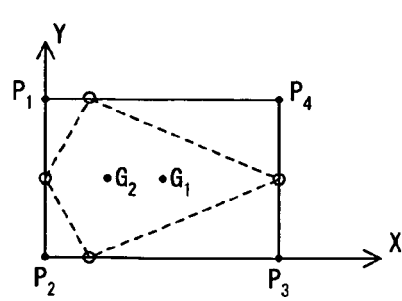

At Step 86, the reading unit 95 compares the calculated distance with the threshold T in magnitude. When the distance is equal to or smaller than the threshold T (refer to FIG. 30(*a*)), it is judged that the embedment information "0" is embedded. When the distance is greater than the threshold T (refer to FIG. 30(*b*)), it is judged that the embedment information "1" is embedded (Step 87).

According to the present embodiment, there is the following effectiveness.

(Effectiveness 1) Since the information reading uses the embedment information independent of rotation operation, reading embedment information can be performed even from the vector data in which the rotation operation is applied.

The present embodiment can be changed as follows.

(1) Although classification is made into two sets according to the classification of the remainder (even or odd), the classification is not limited to the case.

(2) Although it is defined that the threshold T=1, the threshold is not limited to the value.

According to the present invention, the embedment information can be embedded by inserting a new point on the polygonal side, with suppressed shape change of original data. Operating the number of points constituting a polygon, the number of the points not being dependent on rotation operation, allows correct reading of the embedment information from vector data of which rotation operation is applied or from vector data for which the original data is not available.

Embodiment 9

Figure 31A:
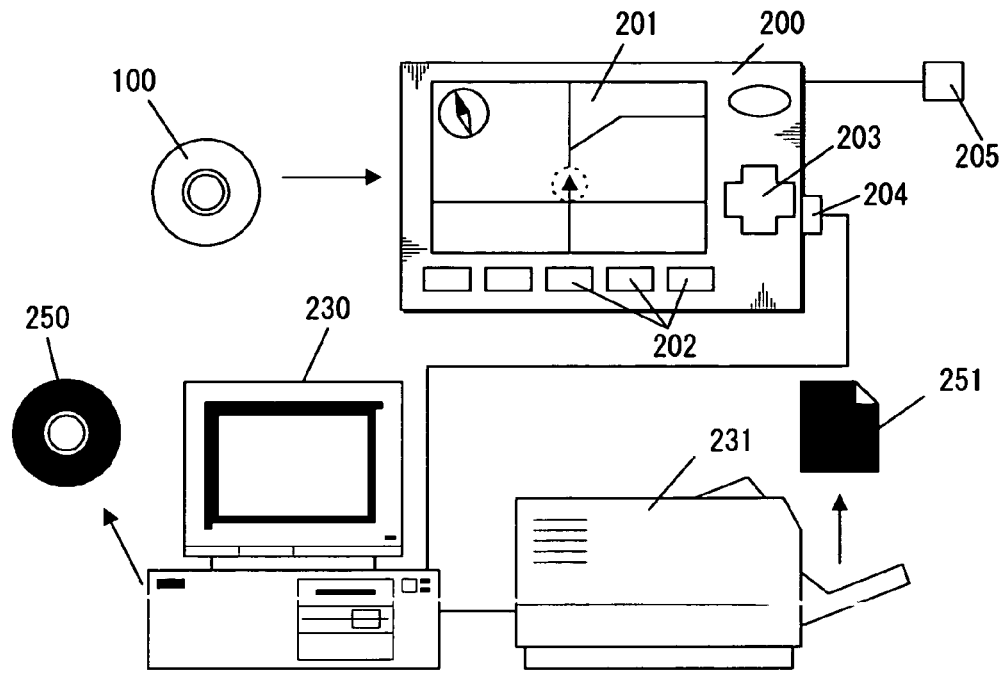
FIG. 31(a) is a diagram illustrating a system structure of electronic equipment according to Embodiment 9 of the present invention and FIG. 31(b) is a functional block diagram of the electronic equipment according to Embodiment 9 of the present invention.
Figure 31B:
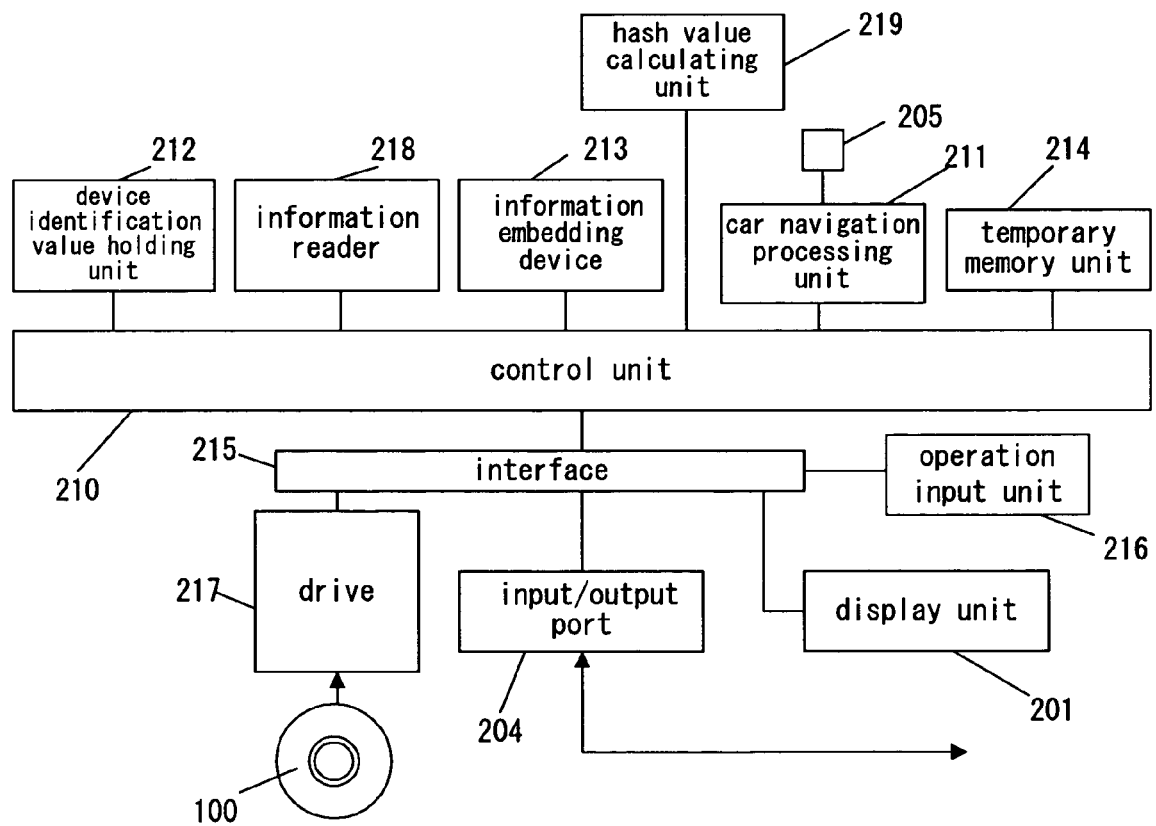
Figure 32A:
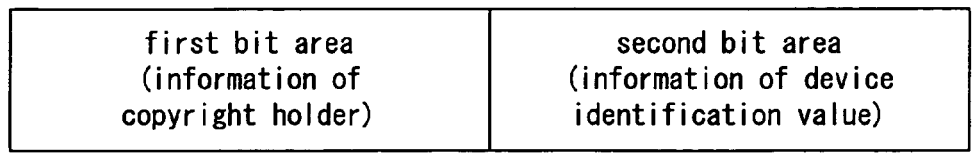
FIG. 32(a) is a diagram illustrating a data structure of embedment information according to Embodiment 9 of the present invention.
Figure 32B:
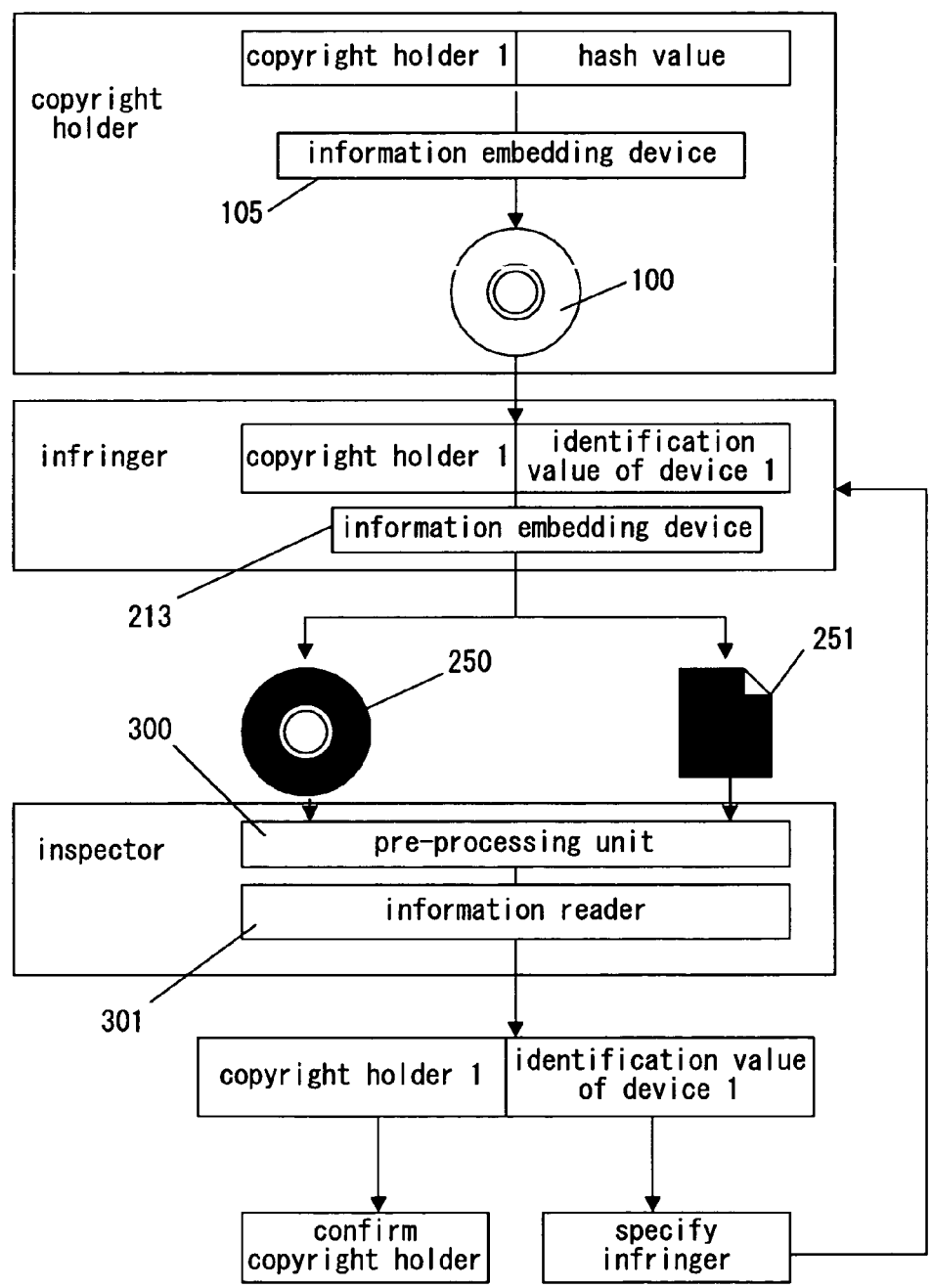
FIG. 32(b) is a diagram illustrating a procedure of an illegal copy exposure according to Embodiment 9 of the present invention.
Figure 33:
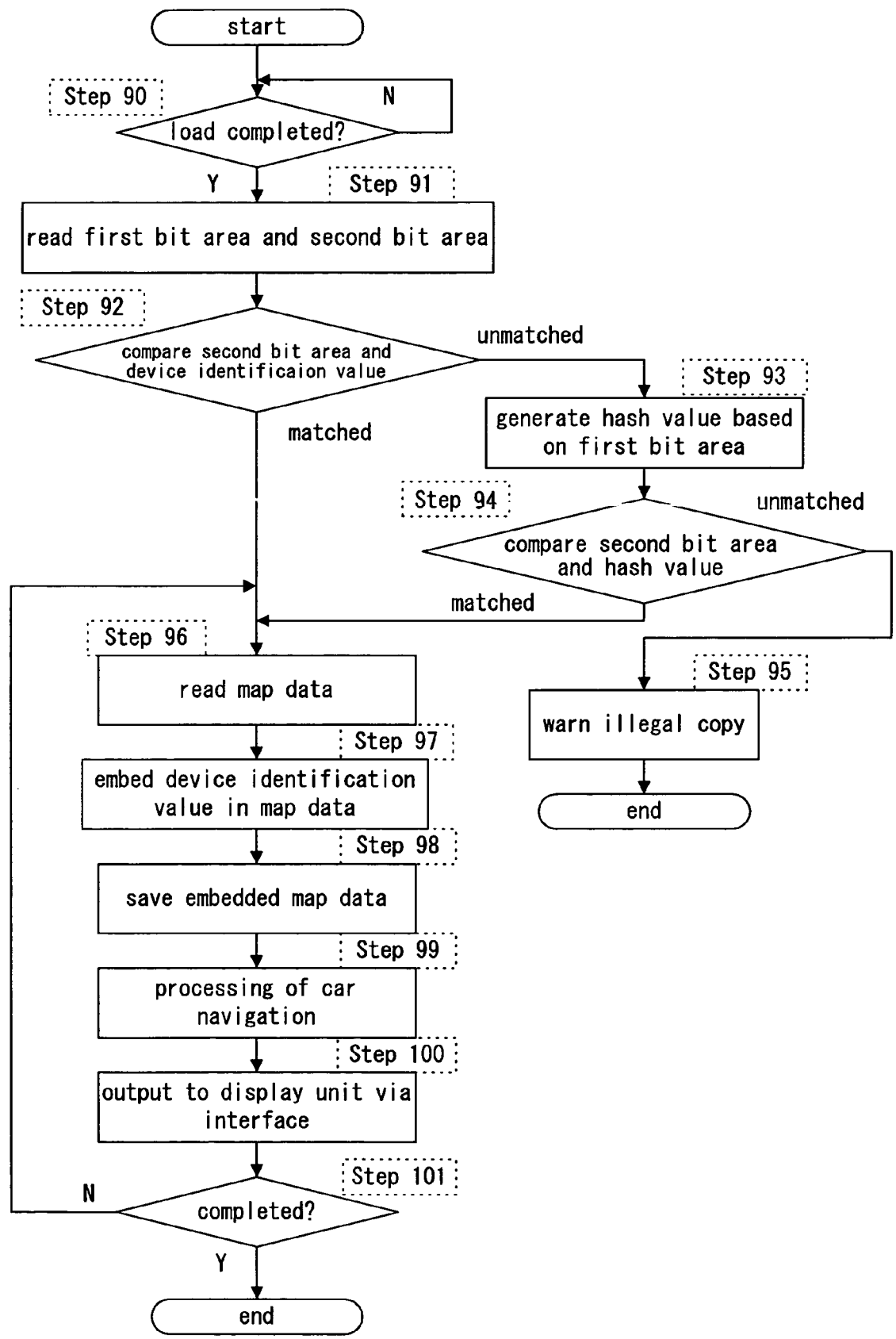
FIG. 33 is a flowchart of the electronic equipment according to Embodiment 9 of the present invention.
Figure 34A:
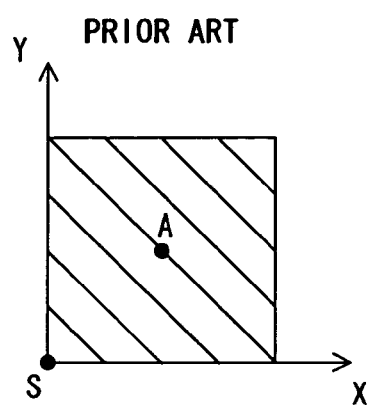
FIG. 34(a) to FIG. 34(c) are explanatory drawings of the conventional information embedding/information reading.
Figure 34B:
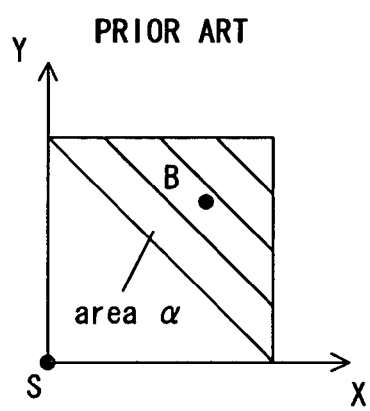
Figure 34C:
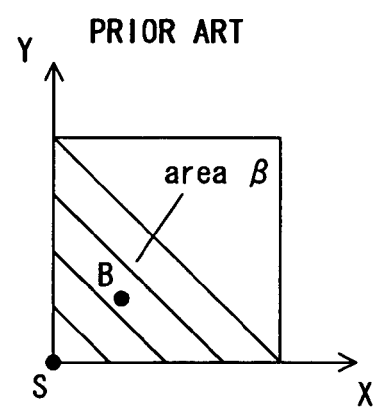
Figure 35A:
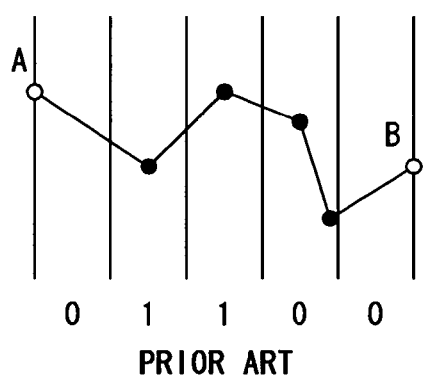
FIG. 35(a) and FIG. 35(b) are explanatory drawings of the conventional information embedding/information reading.
Figure 35B:
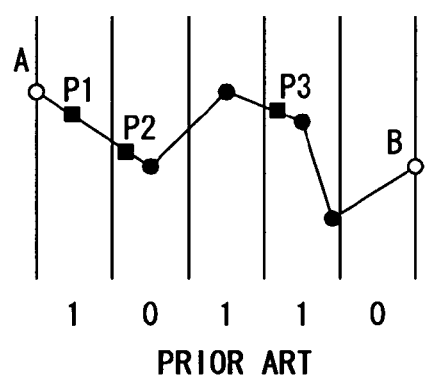

Next, referring to FIGS. 31 to 33, Embodiment 9 is explained. Embodiments 1 to 8 are related to an information embedding device or an information reading device. In the present embodiment, the information embedding device is installed in an electronic device, and an illegal copy of vector data is suppressed. In the present embodiment, the vector data is map data, and the electronic device is a car navigation device using the map data. However, the information embedding device and the information reading device of the present invention are applicable to various kinds of electronic devices using vector data, such as a cellular phone having a GPS function, and a computer graphics device which uses a polygon.

FIG. 31($a$) illustrates a structure of an electronic device in Embodiment 9 of the present invention. FIG. 31($b$) is a functional block diagram of the same electronic device.

It is assumed that a system illustrated in FIG. 31($a$) is a system in which an infringer performs an illegal copy. The infringer purchases a legal recording media 100, sets the legal recording media 100 in a car navigation device 200, and tries to acquire an illegal recording media 250 by performing an illegal copy with a personal computer 230 connected to the car navigation device 200. The infringer also tries to acquire an illegal paper media 251 by performing print out using a printer 231 connected to the personal computer 230.

A GPS antenna 205 of the car navigation device 200 communicates with geostationary satellites, and inputs information in order to know the current location and direction. A display unit 201 displays the current location, the direction, surrounding routes and buildings, etc. Since the direction and the location of an automobile, in which the car navigation device 200 is installed, change variously, map data that is read out from the legal recording media 100 frequently receives the rotation operation, and is displayed on the display unit 201 in an understandable manner as it is shown in FIG. 31($a$). A button 202 and a cross shaped pad 203 correspond to an operation input unit 216 shown in FIG. 31($b$), and receive operation input of a user.

The car navigation device 200 is mounted with an input/output port 204, and can communicate with an external device (for example, the personal computer 230 etc.) via the input/output port 204. Even if such a port is not prepared, since the infringer may destroy a part of the car navigation device 200 and copy the data of the legal recording media 100 forcibly, it is assumed that the port is prepared here.

As shown in FIG. 31($b$), the car navigation device 200 comprises the following elements.

A control unit 210 controls each element of the car navigation device 200 according to the flowchart of FIG. 33. A device identification value holding unit 212 holds an identification value that is given to the car navigation device 200 particularly. The identification value is arbitrary if the car navigation device 200 is uniquely distinguishable. For example, a lot number of product, a manufacture plant name, manufacture date etc. may be used as the value.

An information embedding device 213 and an information reading device 218 may possess a structure according to any of Embodiments from 1 to 7. In the present embodiment, embedment information shown in FIG. 32($a$) is used. The embedment information is multiple-valued. Even an information embedding device and an information reading device which can perform only a one-bit embedding/reading can cope with a multi-value embedment information, for example, by allocating a upper most bit to a first vector, a upper bit following the upper most bit to a second vector, and allocating other bits in the same way (as long as relationship between the bits and the vectors is uniquely determined), since the map data includes extremely many vectors for buildings and routs, etc. Of course, it is desirable to constitute an allocation rule such that the rule is not easily detected by a malicious third person.

A car navigation processing unit 211 performs car navigation processing. Since the present invention does not possess features of the car navigation processing itself, the detailed explanation related to the car navigation processing is omitted.

A temporary memory unit 214 is composed by RAM etc., and saves the data which the control unit 210 requires for processing.

A hash value calculating unit 219 inputs a value from the control unit 210, obtains a hash value for the inputted value using a hash function, and returns the obtained hash value to the control unit 210.

An interface 215 mediates communication between the control 210 and an external device. In the example of FIG. 31($b$), the interface 215 is connected to the operation input unit 216, the display unit 201, the input/output port 204, and a drive 217. The drive 217 reads the data stored in the legal recording medium 100. In the present embodiment, although the car navigation device 200 inputs the map data via the recording media such as a legal recording media 100, the present invention is similarly applicable in a case where the map data is inputted via a network. Moreover, the legal recording medium 100 may be a read-only recording media such as a DVD-ROM and a CD-ROM since it is enough if the information mentioned later is written in the recording media (pirated edition) wherein an illegal copy is performed.

Next, referring to FIGS. 32($a$) and 32($b$), how embedment information is handled is explained.

First, as mentioned above, the embedment information of the present embodiment is multi-valued data shown in FIG. 32($a$). The embedment information stores the value of copyright holder information (for example, a name or title of the copyright holder, etc.) in a first bit area, and the identification value, which the device identification value holding unit 212 holds, of the electronic device in a second bit area. Each bit length of the first bit area and the second bit area is chosen suitably. If each bit length is made longer, reliability increases; however, processing burden becomes heavier. Each bit length is defined in consideration of the relationship of this trade-off. It is more desirable to standardize the bit lengths by an association that manages copyright.

As shown in the upper part of FIG. 32($b$), a copyright holder (a copyright holder 1) authorized to sell the legal recording media 100 or a person who has acquired the license fills the first bit area of the embedment information with the value of the copyright holder information indicating the copyright holder 1, and the second bit area with the hash value of the value of the copyright holder information indicating the copyright holder 1. Then, the copyright holder 1 creates the embedded map data wherein the embedment information is embedded, using the information embedding device 105, records the embedded map data in the legal recording medium 100, and sells the recorded legal recording medium 100. Of course, as mentioned above, the data may be sent via a network.

As shown in the middle part of FIG. 32(*b*), the infringer, who uses a device 1, creates the illegal recording media 250 using the car navigation device 200 and the personal computer 230 with intention to sell it to a third person. The infringer also, creates the illegal paper media 251 using the car navigation device 200, the personal computer 230 and the printer 231, with intention to sell it to a third person. Then, the infringer sells the illegal recording media 250 and the illegal data paper 251 to others, and acquires a profit. At this time, the identification value of the car navigation device 200 (the device 1) is embedded in the second bit area, instead of the hash value of the value of copyright holder information.

As shown in the lower part of FIG. 32(*b*), an inspector (it may be the copyright holder) obtains the illegal recording media 250 or the illegal paper media 251, which is apparently a pirated edition, and reads the embedment information using the information reading device 301. In addition, a pre-processing unit 300 performs pre-processing that is necessary for outputting to the information reading device 301 the map data with the embedment information embedded.

The inspector acquires a value indicating the copyright holder 1 as the copyright holder information of the illegal recording media 250 and the illegal paper media 251 from the first bit area of the embedment information that is read out, and confirms the copyright holder. Moreover, whether the value of the second bit area is the hash value of the value of the first bit area is checked. If it is the hash value, the illegal recording media 250 and the illegal recording media 251 are judged that they have been sold legally. However, since the identification value of the car navigation device 200 (the device 1) is embedded in the illegal recording media 250 or the illegal paper media 251, it is judged to be an illegal copy. In addition, it can be confirmed that the illegal copy is made by using the car navigation device 200 (the device 1). Thereby, the responsibility of the infringer who uses the car navigation device 200 (the device 1) can be pursued.

Next, referring to FIG. 33, the flow of processing of the car navigation device 200 is explained. First, at Step 90, the control unit 210 waits until the recording media 100 is loaded in the drive 217 and it becomes readable.

At Step 91, the control unit 210 reads map data from the recording medium 100, and reads the value of the first bit area and the second bit area using the information reading device 218.

At Step 92, the control unit 210 checks whether the value of the second bit area is in agreement with the identification value which the device identification value holding unit 212 holds. When it is in agreement, the processing moves to Step 96. When it is not in agreement, the processing moves to Step 93.

At Step 93, the control unit 210 makes the hash value calculating unit 219 determine the hash value of the value of the first bit area, and checks whether the hash value and the value of the second bit area are in agreement (Step 94). When it is not in agreement, at Step 95, the control unit 210 warns that the recording medium 100 under processing is an illegal copy, and then the processing is discontinued. Thereby, the recording media that is illegally copied can not be used practically. When it is in agreement, the processing moves to Step 96.

At Step 96, the control unit 210 reads necessary map data, and stores the read map data in the temporary memory unit 214. At Step 97, the control unit 210 embeds the embedment information of which the second bit area is the device identification value in the map data, and stores the embedded map data in the temporary memory unit 214 (Step 98).

Then, the control unit 210 outputs embedded map data to the car navigation processing unit 211, and performs processing of navigation. At Step 99, the car navigation processing unit 211 acquires information from the GPS antenna 205, and performs processing of navigation based on the embedded map data. At this time, the embedded map data frequently receives a rotation operation.

At Step 100, the control unit 210 inputs the processed result from the car navigation processing unit 211, and makes the display unit 201 display the processed result via the interface 215. Thus, since the embedded map data is outputted to the interface 215, even if the map data is transferred to the personal computer 230 via the input/output port 204 connected to the interface 215, the transferred map data is the map data which the device identification value is embedded. Therefore, even if the illegal recording media 250 and the illegal paper media 251 are acquired by using the personal computer 230, the infringer ends up leaving, without knowing, traces that the infringer has performed the illegal copy in the illegal recording media 250 and the illegal paper media 251.

At Step 101, the control unit 210 repeats processing after Step 96.

Generally, when the illegal copy is performed by the paper data media, it is often unclear for an apparently pirated edition and an original to be known whether they are an illegal copy or not. It is because, when printed, the map data has undergone the rotation operation from the state of original in most cases.

However, when processing as shown in FIG. 32(*b*) is performed, illegality can be detected immediately based on the illegal paper media 251, since the information embedding according to the present invention is robust against the rotation operation. Thus, it is convenient.

The present invention can be suitably used in information processing devices which deal with vector data, such as map data.

The invention claimed is:

1. An information embedding device, comprising:
an extracting unit operable to extract information of vertices constituting a polygon, the information of the vertices being extracted from vector data including information of the polygon; and
an information embedding unit operable, utilizing the information of the vertices extracted by said extracting unit, to embed embedment information into the vector data in a robust manner against a rotating operation of the vector data,
wherein said information embedding unit changes a number of points that exist on sides of the polygon in a manner such that a remainder value and a value M of the embedment information have a fixed correspondence, the remainder value being a remainder of a division of the number of points existing on the sides of the polygon by a constant number N, wherein the constant number N is an integer not less than a value of 2 and the value M is a non-negative integer less than the constant number N.

2. The information embedding device as claimed in claim 1, wherein said information embedding unit maintains, according to the embedment information, a total number of points of the polygon for which the embedment information has been embedded.

3. The information embedding device as claimed in claim 1, wherein said information embedding unit maintains, according to the embedment information, a distance between specified points of the polygon for which the embedment information has been embedded.

4. The information embedding device as claimed in claim 1, wherein said information embedding unit changes, according to the embedment information, a number of points that exist on the sides of the polygon.

5. The information embedding device as claimed in claim 1, wherein said information embedding unit inserts a point on a side of the polygon.

6. The information embedding device as claimed in claim 1, wherein said information embedding unit inserts a point at a position apart from a side of the polygon.

7. The information embedding device as claimed in claim 1, wherein the fixed correspondence between the remainder value and the value M is a relationship such that the remainder value equals the value M of the embedment information.

8. The information embedding device as claimed in claim 4, wherein said information embedding unit comprises:
   a constant information inputting unit operable to input the constant number N;
   a remainder calculating unit operable to calculate a remainder obtained by dividing a number of vertices extracted by said extracting unit by the constant number N;
   an inserting number determining unit operable to determine a number of points to be inserted on a side of the polygon in a manner such that the remainder calculated by said remainder calculating unit and the embedment information have a fixed correspondence; and
   an insertion executing unit operable to insert a number of points equal to the number of points determined by said inserting number determining unit into the polygon.

9. The information embedding device as claimed in claim 1, wherein the constant number N is a constant number that does not depend on a number of the vertices of the polygon.

10. The information embedding device as claimed in claim 1, wherein said information embedding unit changes a representative point that has been determined concerning the polygon in a manner such that a correspondence among a plurality of geometrical elements of the polygon changes.

11. The information embedding device as claimed in claim 10, wherein the representative point includes a vertex of the polygon.

12. The information embedding device as claimed in claim 10, wherein the plurality of geometrical elements are selected from a group consisting of a diagonal of the polygon, a center of gravity of the polygon, a vertex of the polygon, and the representative point of the polygon.

13. The information embedding device as claimed in claim 12, wherein, when the diagonal of the polygon is selected from the group, the diagonal of the polygon is a longest diagonal.

14. The information embedding device as claimed in claim 13, wherein said information embedding unit changes the representative point in a manner such that the longest diagonal remains the longest diagonal.

15. The information embedding device as claimed in claim 10, wherein the correspondence among the plurality of geometrical elements is expressed using a distance between the plurality of geometrical elements.

16. The information embedding device as claimed in claim 10, wherein said information embedding unit comprises:
   a correspondence determining unit operable to determine a correspondence between a value of the embedment information and the plurality of geometrical elements; and
   an embedding unit operable to change the representative point according to the correspondence determined by said correspondence determining unit.

17. The information embedding device as claimed in claim 10, wherein the representative point is a center of gravity of the polygon.

18. The information embedding device as claimed in claim 10, wherein the representative point indicates a facility location.

19. The information embedding device as claimed in claim 1, wherein said information embedding unit comprises:
   an inserting unit operable to determine an insertion point to be inserted between two adjacent vertices among vertices extracted by said extracting unit; and
   an embedding unit operable to embed the insertion point determined by said inserting unit between the two adjacent vertices, and
   wherein said inserting unit changes, according to the embedment information, a relationship between a center of gravity of a first figure composed of the vertices extracted by said extracting unit and a center of gravity of a second figure composed of at least three insertion points determined by said inserting unit.

20. The information embedding device as claimed in claim 19,
   wherein the first figure is a polygon extracted by said extracting unit, and
   wherein the second figure is composed of all insertion points determined by said inserting unit.

21. The information embedding device as claimed in claim 19, wherein the relationship between the center of gravity of the first figure and the center of gravity of the second figure is evaluated according to whether or not the center of gravity of the first figure and the center of gravity of the second figure agree.

22. A computer-readable recording medium having a program recorded thereon, the program causing a computer to execute a method comprising:
   extracting information of vertices constituting a polygon, the information of the vertices being extracted from vector data including information of the polygon; and
   embedding, utilizing the information of the vertices extracted in said extracting, embedment information into the vector data in a manner such that the embedment information is held even when a rotation operation of a coordinate system of the vector data is performed,
   wherein said embedding changes a number of points that exist on sides of the polygon in a manner such that a remainder value and a value M of the embedment information have a fixed correspondence, the remainder value being a remainder of a division of the number of points existing on the sides of the polygon by a constant number N, wherein the constant number N is an integer not less than a value of 2 and the value M is a non-negative integer less than the constant number N.

* * * * *